United States Patent
Tyra et al.

(10) Patent No.: US 6,442,565 B1
(45) Date of Patent: Aug. 27, 2002

(54) SYSTEM AND METHOD FOR TRANSMITTING DATA CONTENT IN A COMPUTER NETWORK

(75) Inventors: Kristopher L. Tyra; Grant Robert Gainey, both of Raleigh; David Perry Zimmerman, Willow Spring; Scot Peter Floess, Louisburg, all of NC (US)

(73) Assignee: HiddenMind Technology, Inc., Cary, NC (US)

( * ) Notice: Subject to any disclaimer, the term of this patent is extended or adjusted under 35 U.S.C. 154(b) by 0 days.

(21) Appl. No.: 09/374,160

(22) Filed: Aug. 13, 1999

(51) Int. Cl.[7] .............................................. G06F 17/30
(52) U.S. Cl. ...................................... 707/103; 707/102
(58) Field of Search ............................... 707/103, 10, 1, 707/2, 9, 200, 100, 104, 102; 370/244, 345, 395, 365, 397; 710/8; 709/216

(56) References Cited

U.S. PATENT DOCUMENTS

| | | | |
|---|---|---|---|
| 5,557,798 A | | 9/1996 | Skeen et al. .................. 705/35 |
| 5,689,501 A | * | 11/1997 | Takase et al. ................ 370/244 |
| 5,748,980 A | | 5/1998 | Lipe et al. ..................... 710/8 |
| 5,878,397 A | | 3/1999 | Stille et al. ................... 455/466 |
| 5,961,594 A | | 10/1999 | Bouvier et al. ............. 709/223 |
| 5,987,018 A | * | 11/1999 | Freeburg et al. ............ 370/345 |
| 5,999,528 A | * | 12/1999 | Chow et al. ................. 370/365 |
| 6,003,097 A | | 12/1999 | Richman et al. ................ 710/8 |
| 6,081,530 A | * | 6/2000 | Wiher et al. ................. 370/395 |
| 6,085,233 A | * | 7/2000 | Jeffrey et al. ............... 709/216 |
| 6,104,715 A | * | 8/2000 | Basso et al. ................. 370/397 |
| 6,148,000 A | * | 11/2000 | Feldman et al. ............ 370/397 |

OTHER PUBLICATIONS

Reaves, M. Stan, "The Success of Tibco Inc.'s Event-Driven Network Paradigm . . . ", The Buzz Wall Street & Technology 1998, http://www. tibco.com/abouttib/wst_spring98.htm (7pages).

JavaSpaces Specification, 1998 Sun Microstystems, Inc., Palo Alto, CA.

Sun Microsystems, Inc., Java Naming and Directory Interface Service Provider Interface, Jul. 14, 1999, San Antonia, CA.

Kohl and Neuman, Digital Equipment Corporation, the Kerberos Network Authentication Service (V5), Sept. 1993 (99 pages).

* cited by examiner

Primary Examiner—Sanjiv Shah
(74) Attorney, Agent, or Firm—Dorsey & Whitney LLP

(57) ABSTRACT

A system for transmitting data content and performing operations on the data content within a distributed system. Client machines within the system transmit to a server a request for a particular operation. The server constructs a response message, transmits it to the client, and also transmits it to other machines including a reference to the requested information.

11 Claims, 25 Drawing Sheets

500 THE PULL QUEUE

600 THE ENTRY EVENT

700 THE SUBSCRIBER INTERFACE

800 THE SUBSCRIPTION AND COMPARISON INTERFACE

THE JAVA RELATIONAL COMPARISON

THE SUBSCRIBE/UNSUBSCRIBE MODEL

THE BROADCAST INTERFACE

THE DATA CELL ADDRESS

1200 — THE BROADCASTING MODEL

THE DATA CELL MODEL

1500
THE DATA CELL SYNCHRONIZATION MODEL

1700 THE HIERARCHICAL DATA CELL

1800 THE DATA SERVICE LOGIC

THE DATA SERVICE MANAGER

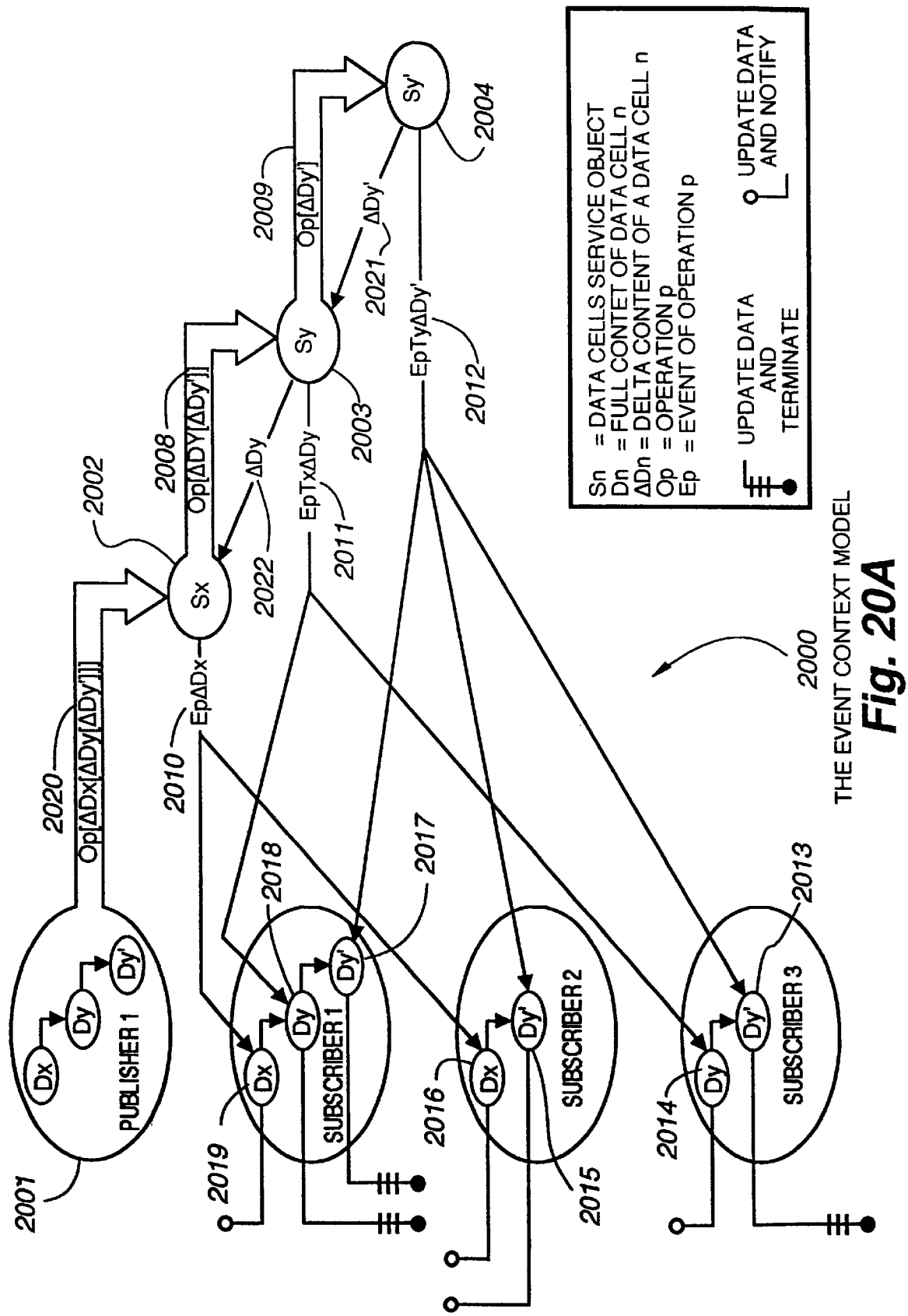
Fig. 20A THE EVENT CONTEXT MODEL

2300 THE BROADCAST FLOW

2900 ON DEMAND FLOW

SYSTEM AND METHOD FOR TRANSMITTING DATA CONTENT IN A COMPUTER NETWORK

FIELD OF THE INVENTION

The present invention relates to a system and method for providing communication among computers and devices in a network or distributed system, and more particularly it relates to a system and method of performing operations within the network or distributed system and transmitting throughout the network data content information.

BACKGROUND OF THE INVENTION

Computer users often desire information concerning changes in data through a computer network. In order to obtain updated information concerning particular updated data, however, a user must typically repeatedly access the information in order to obtain the most current version of it. For example, if the user desires to know when a particular stock price increases by five percent, the user typically must repeatedly access the information to obtain the current price, or obtain real time information concerning the stock price, and determine therefrom when an increase of five percent occurs. Likewise, if the user desires to sell the stock upon a five percent increase, the user typically must manually execute a sell command, rather than having the user's machine trigger execution of an automatic sell command upon detecting the required change. Also, the processing to determine when a particular change occurs typically happens at the user's machine, increasing the amount of processing required by that machine and other machines seeking the same information.

Obtaining information through the network also involves two-way communication. Each time a user desires updated information, the user's machine transmits a request for the information. In response, a server or another machine transmits the updated information to the user's machine. Therefore, receiving updates to particular information, such as stock prices, requires repeated two-way communication between user machines and a server, resulting in increased network traffic.

In addition, a computer may transmit information concerning particular data to an entire network of computers. For example, a server may transmit through a network information concerning current stock prices. However, it usually transmits that information throughout the entire network, making it available to any user who desires it. Such an approach increases network traffic in comparison to sending information only to users having requested it or with a specific need to know.

Accordingly, a need exists for improved communication of changes in data within a computer network or distributed system.

BRIEF DESCRIPTION OF THE DRAWINGS

FIG. 20A is a diagram of an event context model.

SUMMARY OF THE INVENTION

Figure 1:
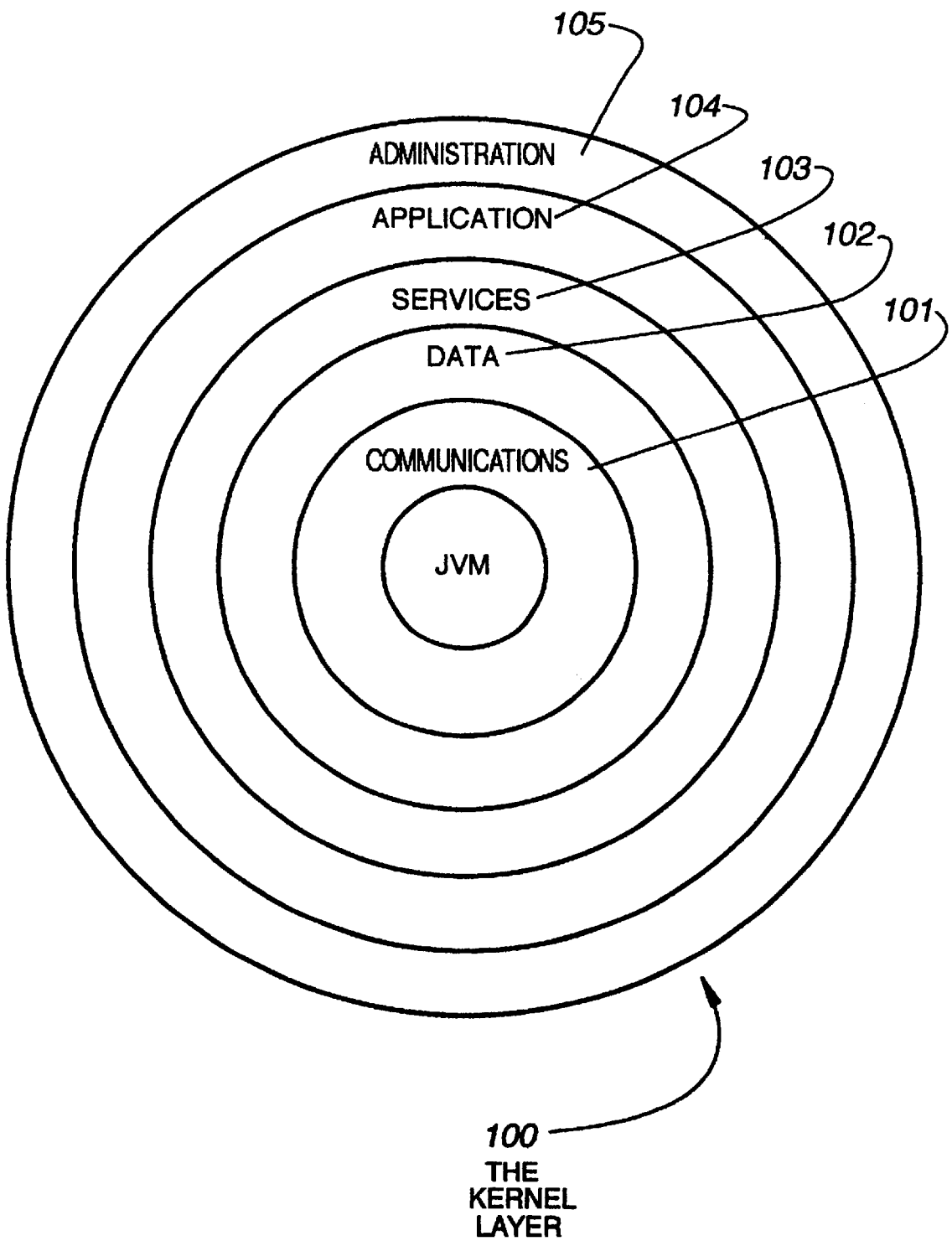
FIG. 1 is a diagram of kernel layers in a system consistent with the present invention.

A first apparatus and method consistent with the present invention perform operations on data within a network. A request for an operation to be performed on particular data content is received from a machine in the network, and information related to the operation is locally stored. The operation is implemented and an event is transmitted relating to the operation for use in communicating the operation to subscribers referencing the machine.

A second apparatus and method consistent with the present invention generate a subscription to events occurring within a network. A subscription event for a machine in the network is generated using a local notification service. The subscription is made to the global notification service who sends a subscription event to the local notification service for registration of the event for subsequent use in notifying the machine of particular events occurring within the network, and a notification of the registration of the event is received from the global notification service.

A third apparatus and method consistent with the present invention broadcast notification of events occurring within a network. A broadcast event is received concerning occurrence of a particular event within the network. Subscribers having subscriptions registered for a notification of the event are determined, and the notification is transmitted to a local notification service associated with each of the subscribers for use in notifying the subscribers of the occurrence of the event.

A fourth apparatus and method consistent with the present invention downloads files in a network along with changes in a format of files. A request for a file including an identifier for the file is received. It is determined whether the file exists in an associated memory, and a search is performed for the file by manipulating the identifier and comparing the manipulated identifier with available files. A located file and associated changes in a format of the file are downloaded based upon the determining and the searching.

Other aspects consistent with the present invention include various objects stored in computer-readable media and capable of electronic transmission between machines in a distributed system or network.

A data cell object includes an indication of code identifying the object, a plurality of content flags identifying types of content within the object, a plurality of transmission flags specifying how to broadcast the content in the network, and a plurality of error flags specifying errors in the content.

An enumeration data cell object specifies an indication of a plurality of data cell objects, each of the data cell objects including a plurality of content flags identifying types of content within the object, a plurality of transmission flags specifying how to broadcast the content in the network, and a plurality of error flags specifying errors in the content.

An hierarchical data cell object specifies an indication of a plurality of data cell objects, each of the data cell objects including a plurality of content flags identifying types of content within the object, a plurality of transmission flags specifying how to broadcast the content in the network, and a plurality of error flags specifying errors in the content, the hierarchical data cell object further specifying a pointer identifying a parent data cell associated with the hierarchical data cell within a hierarchical structure of content.

DETAILED DESCRIPTION

Overview

The system described in the present specification uses push technology to fuse together information using a distributed object oriented technology. It may be used in environments in which an underlying communication model is slow or does not maintain constant connection between devices. The technology reduces the amount of data communication between objects in a network and is thus inherently well-suited for small bandwidth communication systems, for example. Along with a reduction in the administration of these objects within a network, the technology may be used with heavily distributed processing by promoting lightweight distributed objects bound to data content.

The technology includes triggering of logic due to changes in content or state of data, resulting in a network-wide state transition. The logic with differential data between its last known state and its current state is delivered to network entities in order to implement the network-wide state transition. Each entity uses the logic and differential data in order to locally update its data in order to implement the state change.

As shown in FIG. 1, the system may be considered a kernel having kernel layers 100 because of the manner in which it provides services in a layered form to an application developer; therefore, the term kernel is used in this specification to represent all layers and application program interfaces (APIs) of an exemplary embodiment of the system. The exemplary kernel is segmented into five layers. Using network queuing, and interruptible and threaded event loops, a communications layer 101 is the base of all layers and handles all communication between the other layers. The second layer, data layer 102, utilizes communications layer 101 to uniquely identify and coalesce data content between distributed objects and is thus referred to as the data layer. On top of this is a services layer 103, which provides a model for distributing an application's functional processing by components using a simple model of remote method invocation (RMI). RMI is known in the art and allows objects to be run remotely through a remote procedure call. Application layer 104 provides a framework to bundle together all the services in such a way as to provide a coherent N-tier application. Application layer 104 is maintained by functions in an administration layer 105, which provides a model for managing whole applications and their services throughout a network of wired and wireless computing devices. In particular, administration layer 105 is used to define, install, and update an application.

Figure 2:
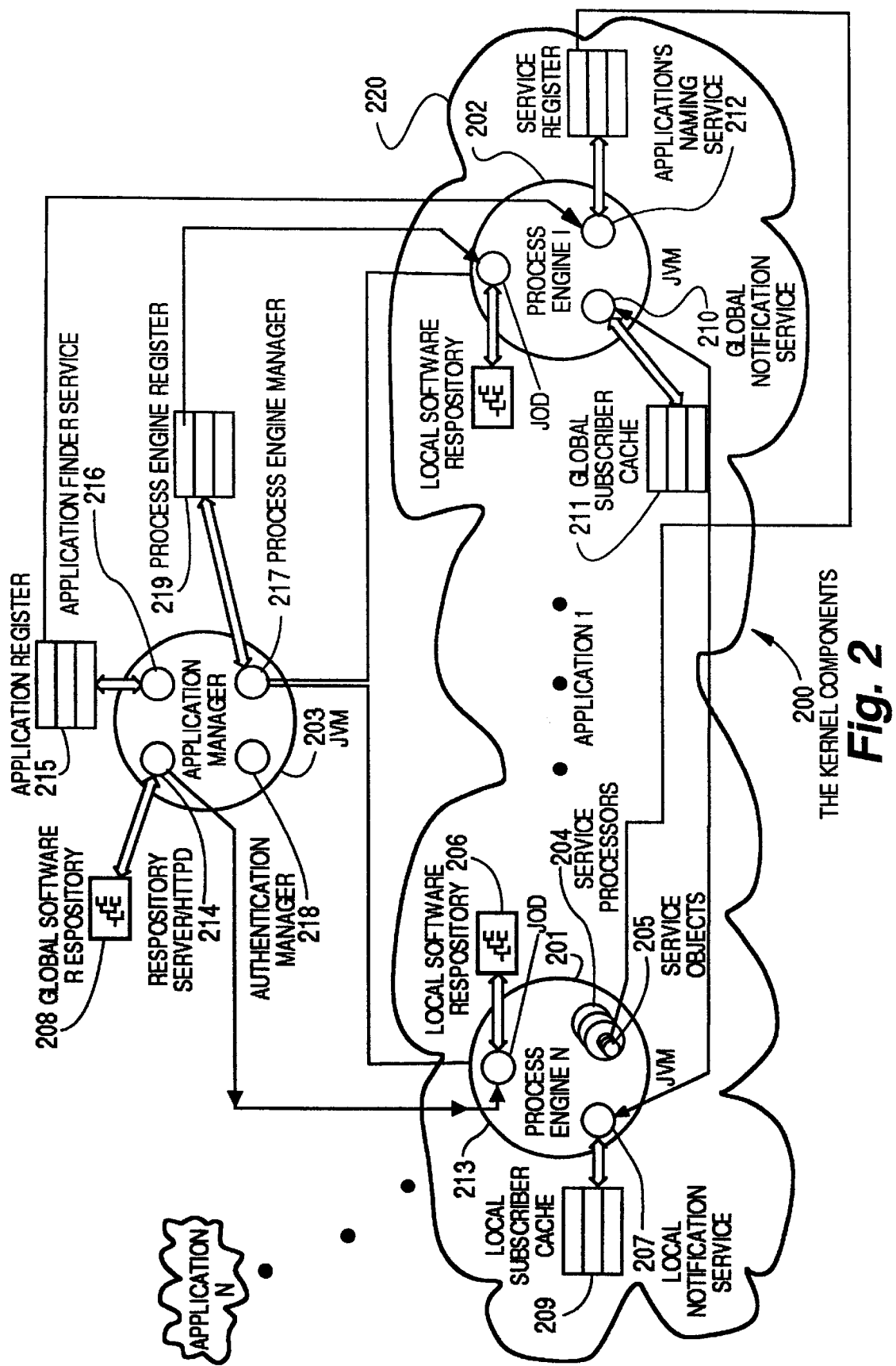
FIG. 2 is a diagram of the kernel components.

As shown in FIG. 2, a kernel 200 includes a collection of process engines (PEs) 201, 202 managed by an application manager 203, which is itself implemented as a specialized PE. An application is defined as a collection of service processors 204 connected via a local notification service 207 and a global notification service 210. Service objects 205, which run asynchronously, are distributed throughout PEs 201, 202, where a PE is formed from a Java virtual machine (JVM) 213, a local software repository 206, notification service 207 and service processors 204. The hardware that runs a PE may be a generic central processing unit (CPU), an embeddable CPU such as an application specific integrated circuit (ASIC), or a mobile CPU such as a cellular phone. The JVM may run on the same physical hardware or machine in separate processes or on different physical hardware or machine using a network. The JVM uses the Java programming language and is described, for example, in a text entitled "The Java Virtual Machine Specification," by Tim Lindholm and Frank Yellin, Addison Wesley, 1996, which is incorporated herein by reference. The Java programming language is described, for example, in a text entitled "The Java Language Specification" by James Gosling, Bill Joy, and Guy Steele, Addison-Wesley, 1996, which is incorporated herein by reference.

Local software repository 206, which is a replication of a global software repository 208, contains a temporary persistent copy of the software modules that will be used by the JVM in order to carry out the functions of the services that are defined by applications 220, 221. Service processors 204 are Java objects that maintain service objects 205. Service objects 205 are application specific objects that implement functional business rules and operations as well as maintain data. Service processors may be, but are not limited to, processes that provide unmanned ("middleware") operations, man-machine interfaces (graphical user interfaces), and persistent storage interfaces. Service processors 204 communicate in an asynchronous model using a "publish and subscribe" concept. Service processors are both publishers of information as well as subscribers of information. This model allows for a continuous stream of data in which business functions are performed as the data changes states.

This model is implemented by having service processors 204 and their service objects 205 subscribed to other data of other processors using conditional subscriptions. Using a non-persistent table called the local subscriber cache 209, the local notification service 207 of a PE 201 maintains the subscriptions for service processors 204 within the PE 201. The global notification service analyzes data moving throughout the network and updates local notification services with events and subscription ids for subscribers who belong to local notification services requiring events. The software that analyzes the data for a subscription is passed along with the subscription and is defined by the processor making the subscription request, which is known as a subscriber. This model provides a method by which applications may upgrade information exchange procedures dynamically. Information exchange throughout the kernel 200 is performed by a notification service of one PE communicating with a notification service of another via global notification service 210. Global notification service 210 handles subscriptions for all local notification services 207 using its own global notification cache 211.

Service objects 205 provide information to the application 220 at large by sending or broadcasting information to the global notification service 210, which in turn determines which local notification services 207 should receive the broadcasted information and forwards the content on to these services. The local notification service 207 then interrupts service processor 204 with the broadcasted information. At a higher level service objects 205 use this information conduit to coalesce data between themselves by having subscribing service objects maintain copies of information and the service object which owns the information, and provide update instructions to the replicated information. Furthermore, service objects may also create, update and otherwise modify information by execution of functions or operations within other service objects. They perform these remote operations by finding other service objects using applications naming service 212, which provides a means of finding other services based upon functions required or information requested.

Application manager 203 is a specialized PE that handles all application management facilities. The first component of this management is the delivery of software modules that are used to run the application. Repository server 214 is a specialized HyperText Transport Protocol (HTTP) daemon, which delivers software content to the requesting PEs 201, 202 by using the standard HTTP protocol. In addition, repository server 214 provides remote functions for creating, installing and updating the software modules required by an application such as applications 220, 221. In order to maintain applications which are in a constant state of change, repository server 214 also provides a means for maintain multiple version of the same application. The next components, application register 215 and finder service 216, maintain a mapping of all the application's service processor types with the software contained in the global software repository 208 required for functional operation. The application finder service 216 uses standardized naming services such as the Java Naming and Directory Interface (JNDI) product and the JavaSpaces product to provide its functionality.

The JavaSpaces product is described, for example, in the following text, which is incorporated herein by reference: "JavaSpaces™ Specification," copyright © 1998 by Sun Microsystems, Inc., 901 San Antonio Road, Palo Alto, Calif. 94303. The JNDI product is described, for example in the following texts, which are incorporated herein by reference: "Java™ Naming and Directory Interface™ Service Provider Interface (JNDI SPI)," copyright © 1999 by Sun Microsystems, Inc., 901 San Antonio Road, Palo Alto, Calif. 94303; and "Java™ Naming and Directory Interface™ Application Programming Interface (JNDI API)," copyright © 1999 by Sun Microsystems, Inc., 901 San Antonio Road, Palo Alto, Calif. 94303.

PE manager 217, the third component, is used to maintain which PEs may provide the processing power for service processors of a particular application such as applications 220, 221. In addition, PE manager 217 provides methods for starting and stopping these service processors automatically or manually. The last component, authentication manager 218, handles authentication of PEs. Authentication manager 218 may use standard authentication policies such as those provided by the Kerberos product described, for example, in a text entitled "The Kerberos Network Authentication Service (V5), by J. Kohl, Digital Equipment Corporation, and C. Neuman, ISI, September 1993, which is incorporated herein by reference.

Communications Layer

The push conduit is the term given to communications layer 101 of kernel layers 100. The reason for this is that kernel layers 100 in this exemplary implementation are based around the concept of pushing information from one process to another. Providing information to an asynchronous process that is interrupted from its normal task to handle the information flow marks specifically the concept of "push." The base of kernel layers 100 is thus formed around an object known as the pQueue.

Figure 3:
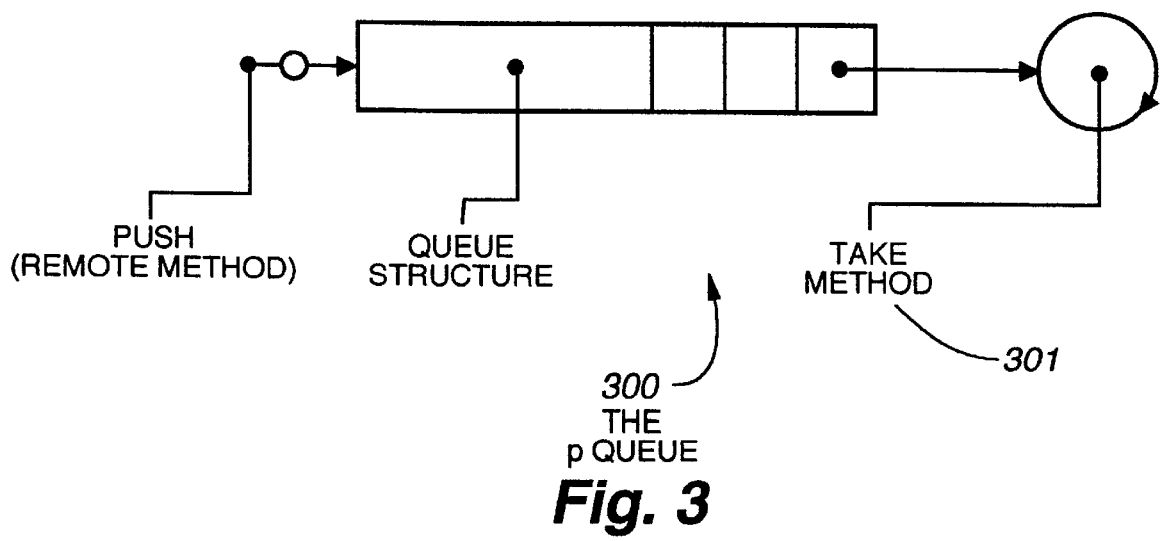
FIG. 3 is a diagram of a pQueue.

As shown in FIG. 3, a pQueue 300 is an interface that is designed to implement an asynchronous queue. Objects placed on the queue are taken off the queue in a lightweight process known as a take method thread 301, which is running in parallel to processes placing data on the queue. The take method is a function that removes an object off the queue and processes the object by calling the notification method of the object which maybe either local or remote. How the process is handled once it is removed from the queue depends on an implementation of pQueue 300. Different pQueues 300 can be created to handle objects in different ways. The pQueue 300 interface is used throughout the kernel in almost any location where it is beneficial to split processing into parallel tasks.

Figure 4:
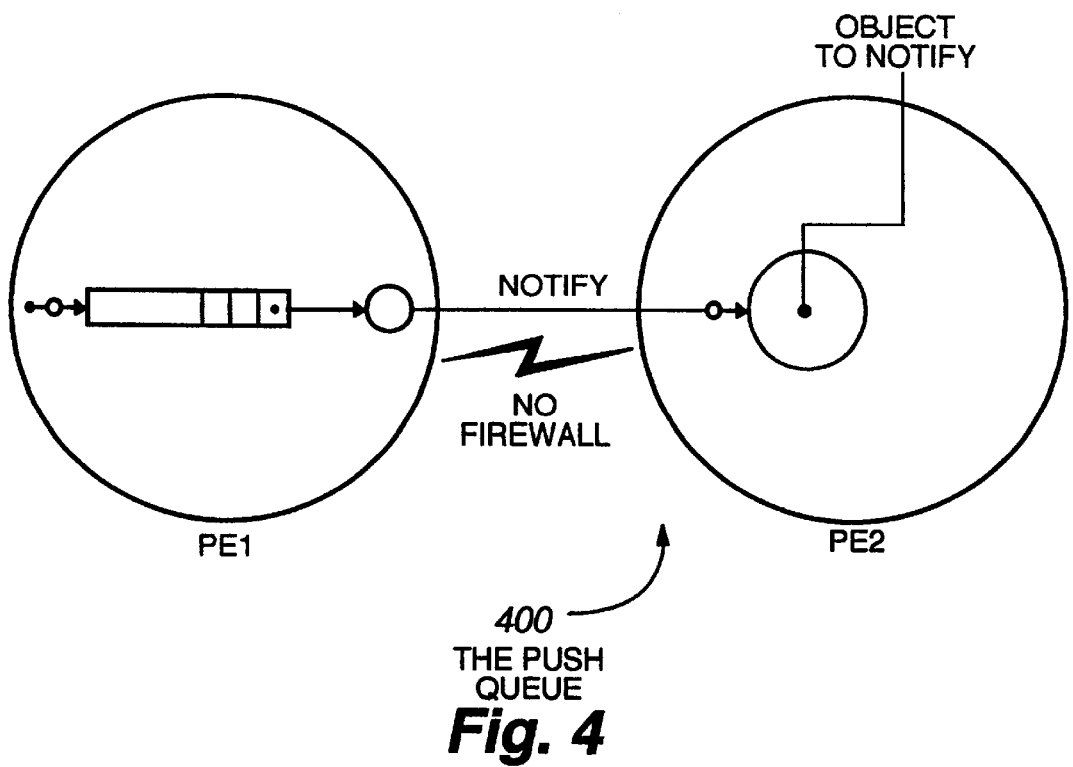
FIG. 4 is a diagram of a push queue.

As shown in FIG. 4, a push queue 400 is an implementation of pQueue 300 and is a base implementation for handling the processing of objects in an asynchronous or parallel manner. Take method 301 of a push queue 400 is implemented as a lightweight process known as a take thread. The take thread spins off the handling of the object in a separate lightweight process and two methods exist for handling this. In the first, the object notification function is called and the take thread waits for the processing to complete. In the second, the object's notification function is called and the take thread immediately starts on the next object on the queue. One of these techniques will be invoked depending on whether the notification of the object taken from the queue should or can be handled in parallel or whether it must be handled synchronously. Push queue 400 cannot necessarily be used through a firewall or with machines that are not correctly configured for unique Internet addressing (i.e., Internet Protocol (IP) masquerading). This is the case when the object to be notified is a remote object. For example, a PE that is on the outside of a firewall may not make a remote call to another PE on the inside of a firewall. This is done for security so that a remote system may not start a spoofing session.

Figure 5:
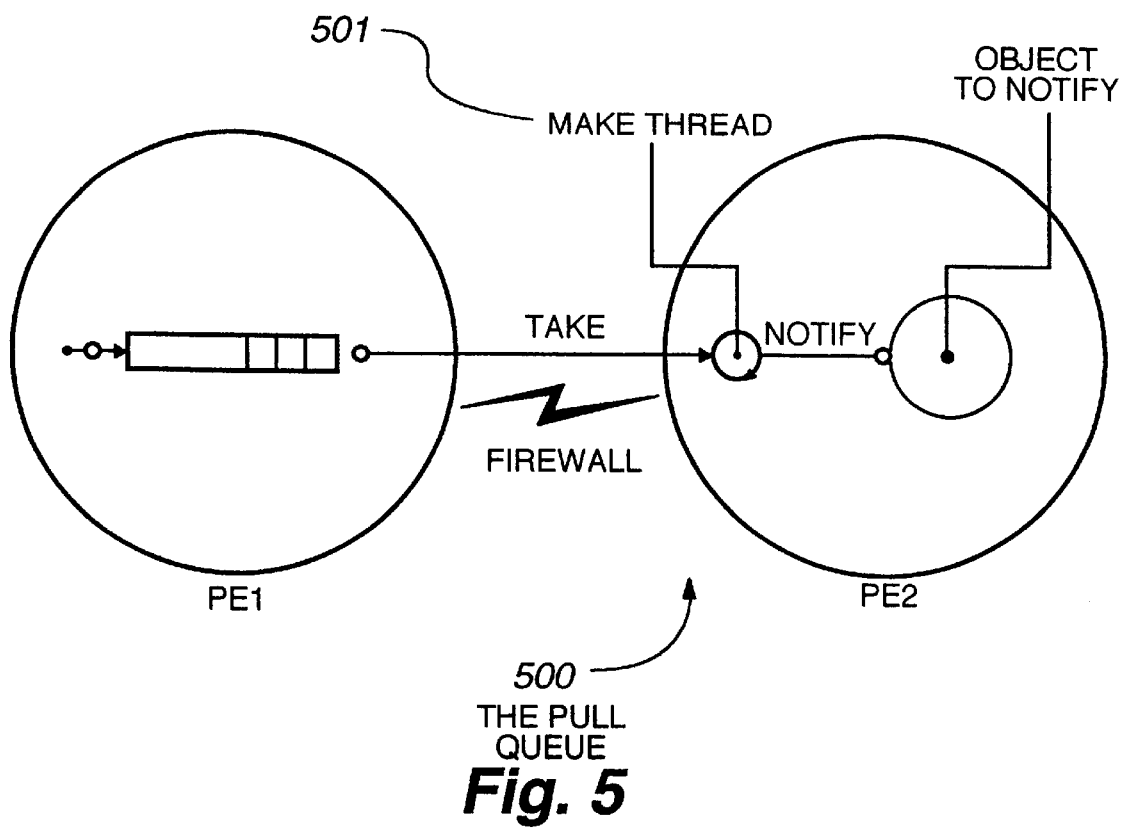
FIG. 5 is a diagram of a pull queue.

As shown in FIG. 5, a pull queue 500 is designed to overcome the firewall limitation of push queue 400 by maintaining the same functionality as push queue 400 without certain inherent limitations. Instead of a take thread, pull queue 500 has a wake thread 501. Wake thread 501 executes on the PE that is inside of the firewall. This method wakes up on a user-specified interval and makes a remote call to request any objects that might be sitting on the queue of the PE outside the firewall. Since the pull queue 500 uses the same pQueue interface as push queue 400, the kernel may choose either method, depending on the situation. The kernel automatically determines the method to use by attempting to make a remote call to any PE connecting to the cluster of PE's commonly referred to as the application. If the call cannot be made, then the new PE attempting connection will be considered to be behind a firewall and a pull queue 500 will be setup for the PE instead of the more efficient push queue 400.

Figure 6:
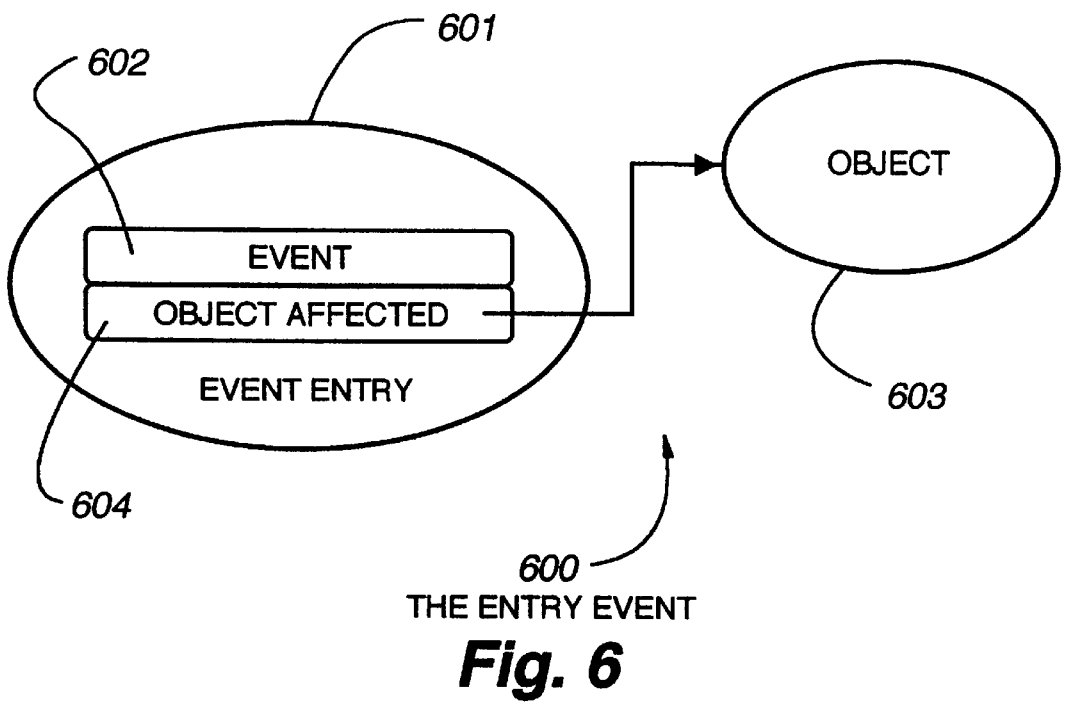
FIG. 6 is a diagram of an event entry.

As shown in FIG. 6, an event queue 600 is a specialized queue that is a further refinement of push and pull queues 400 and 500. Event queue 600 has only one type of object placed on its queue structure. This object is known as an event entry 601. Event entry 601 contains an event 602 and an affected object 604. The event 602 describes a type of action to be taken when entry 604 is received by the take method. Objects 603, known as "listeners," register themselves with the take method to be called when an event of a registered type appears on the queue. In addition, event entry 601 provides the name of a method within the listener's object to be executed when the listener is notified. Event entry 601 also provides an object affected which is considered to be the object affected by some particular external event. This object is an arbitrary object passed as a parameter to the listener's notification method.

Figure 7:
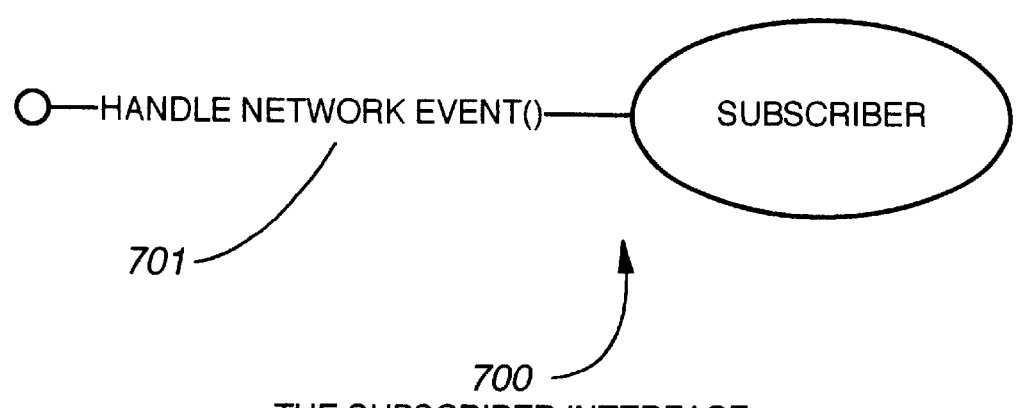
FIG. 7 is a diagram of a subscriber interface.

As shown in FIG. 7, a subscriber 700 is any object which provides a handleNetworkEvent( ) method 701 where the event provided in an event queue is passed as a parameter to this method. The method may be called asynchronously; however, while in the method no interruptions occur (i.e., performing as a synchronous method). In this way, subscribers always receive events in the same order in which they were published. Subscribers are objects that register themselves as listeners to data via another object called a conditional subscription. Subscribers create these conditional subscriptions that are then passed on to a notification service in order to have subscriber 700 notified by the kernel that the object wishes to have its handleNetworkEvent( ) method called whenever an object is broadcast that meets the subscriber's criteria. A conditional subscription is an object that contains a module with which to determine if an object is of interest. Conditional subscriptions are kept with the notification service and used by the service to determine if an object being broadcast by a publisher is of interest to the particular subscriber. The object or module that performs this function is called a comparison and is described by a comparison interface.

Figure 8:
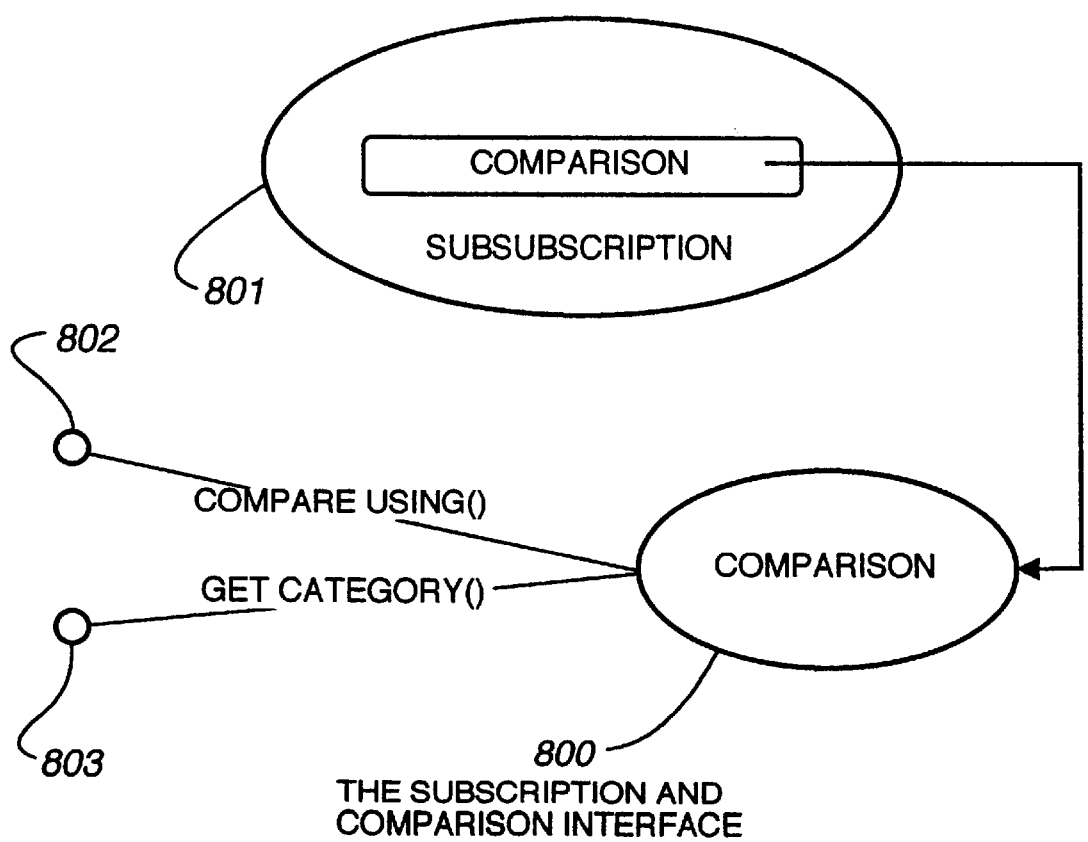
FIG. 8 is a diagram of a subscriber and comparison interface.

As shown in FIG. 8, a comparison 800 can be any object that implements a comparison interface. The purpose of comparison 800 is to determine whether or not another object can be considered an object-of-interest (OOI); that is whether or not an object has content that is deemed important to a subscriber 801. The notification service uses the comparison of a subscription to analyze an object being broadcast from a publisher and passes the object as a parameter to a compareUsing( ) method 802 of the comparison. CompareUsing( ) method 802 of each comparison object returns a result of "true" denoting that the object provided is an OO1 or "false" if it is not. By returning true the object is considered comparable to the comparison object using the algorithm defined with compareUsing( ) method 802. A getCategory( ) method 803 is called to categorize a comparison and is invoked by a notification service in order to reduce the possible set of comparisons that a broadcasted object might go through before it is determined that it is an OOI.

Figure 9:
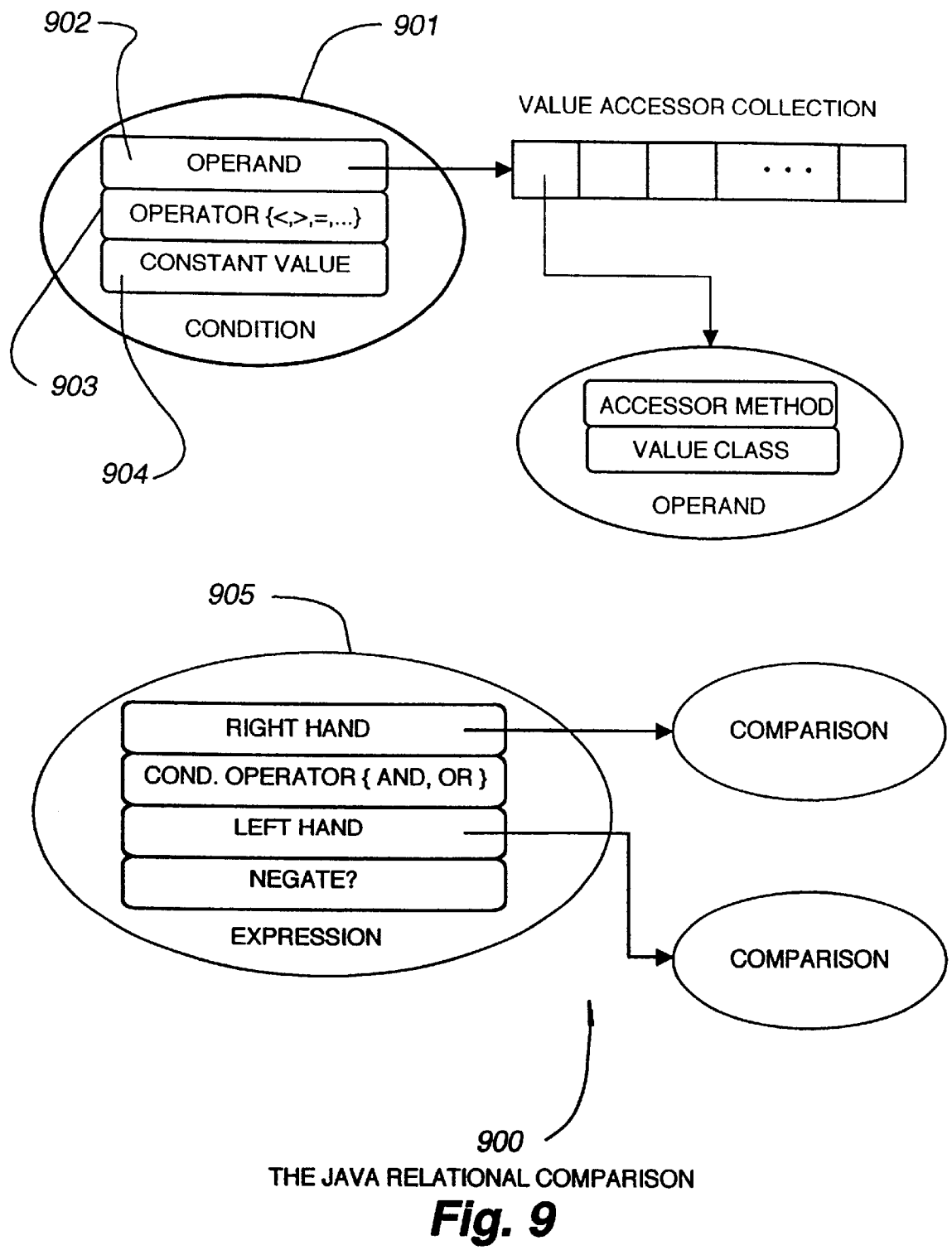
FIG. 9 is a diagram of a Java relational comparison.

Since a comparison 800 is an interface, it requires an actual implementation to be performed. Although normally created by an application developer, a rather common implementation is provided by the kernel to make the task of subscriptions easier. As shown in FIG. 9, the Java relational comparison 900 is a specific implementation of a comparison 800 that uses relational algebra to determine whether or not an object is an OOI. These comparison objects are combined using two different kinds of objects. First, a relational condition 901 compares an attribute value 902 found in a specified object with a constant 904 using the relation operator 903 specified as an attribute of the comparison. An operator 903 may be one of "equal," "less than," "less than or equal too," "greater than," "greater than or equal too," or "like," "class," "instanceof," "null," or "not null."

The method of determining the value of an attribute within the OOI to be compared against the constant value 904 is described in the operand 902. Since the object passed may have references to other objects and since the value that needs to be compared may be deep within these objects, the operand 902 specifies a series of drill down methods to extract the exact value from the object. A description for performing this extraction is specified in the flow chart of FIG. 20B. The second comparison object is the relational expression 905, which is a model for combining two comparisons together using a Boolean operator, ("AND," "OR," "NOT AND," or "NOT OR"). Since the left and right side of an expression is itself a comparison, expressions may be combined together in order to create an expression tree. The getCategory( ) of both these objects returns an object class as the category to be used by the notification service. The object class returned is the result of a lattice join of all object classes used within the comparison. In other words, the returned category is the "least common denominator class" of all objects accessed by the comparison.

Figure 10:
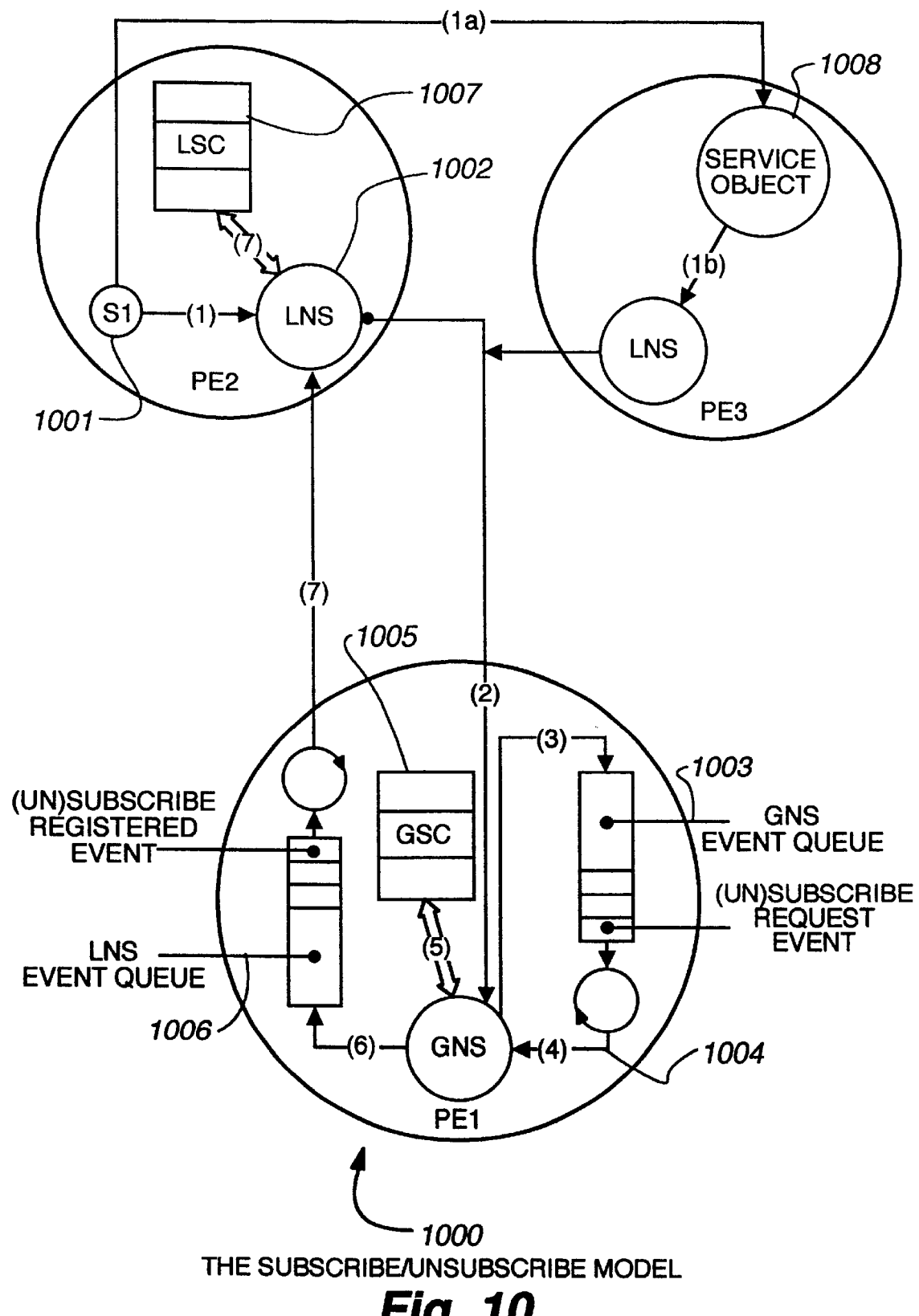
FIG. 10 is a diagram of a subscribe/unsubscribe model.

As shown in FIG. 10, an incoming subscription request on behalf of the Subscription/Subscriber pair S1 (1001) is passed to the GNS who in turn wraps it in a subscribe/unsubscribe event along with a remote reference to LNS 1002 and a unique key generated for each subscription and puts it on to the Global Notification Service's event queue 1003. Note that the subscription request can come from either LNS 1002 directly or some Service Object 1008 in PE3 who is performing some service for S1 that requires the subscription be setup up for S1 on its behalf. GNS 1004 puts the subscription in the global subscription cache 1005 based upon the category returned by the comparisons getCategory( ) method and the comparison itself, where categories and common comparisons are grouped together. The event is then sent back to LNS 1002 by placing the event onto an LNS event queue 1006 to inform it that the subscription has been registered. LNS 1002 then stores this within its local subscription cache 1007 grouping on the unique subscription key. This model thus provides a proper sequencing of events, such that subscriptions occur within the correct order. The unsubscribe process is the same but instead of storing the subscription it is removed.

Figure 11:
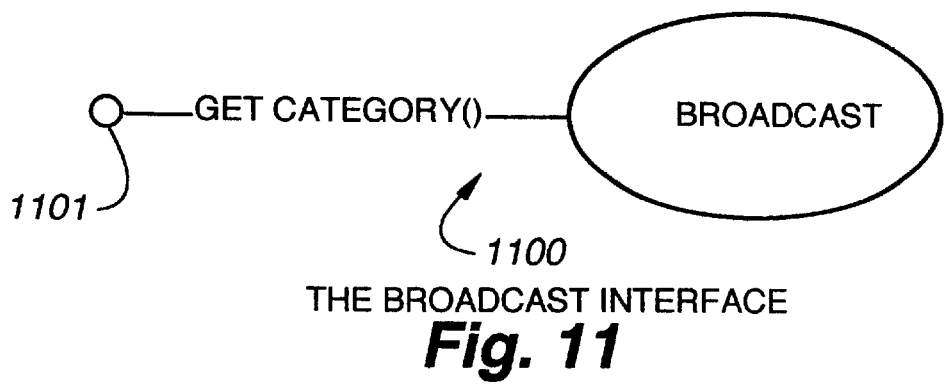
FIG. 11 is a diagram of a broadcast interface.

As shown in FIG. 11, a publisher 1100 is any object which sends events onto the notification services for broadcast to subscribers. To reduce the number of subscription matches, the data pushed on to the queue may implement the broadcast interface, which requires one method getCategory( ) 1101. This method is similar to the method specified in the conditional subscription, in that it returns a category by which a notification service may determine which comparisons to try. Certain implementations of the broadcast interface return the class of the data to be published. If a published object does not implement the broadcast interface, then the class of the object is assumed to be the category.

Figure 12:
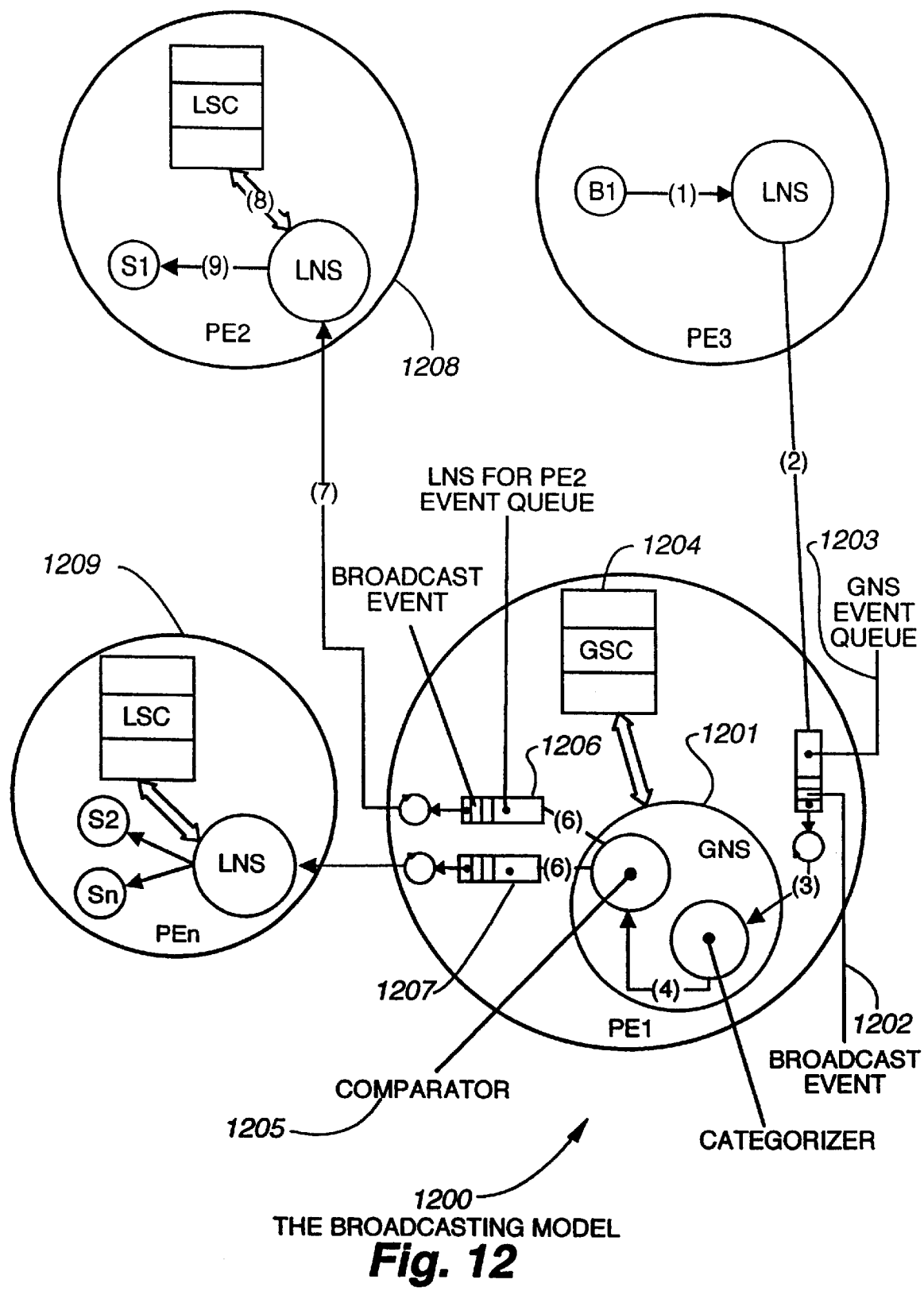
FIG. 12 is a diagram of a broadcast model.

As shown in FIG. 12, publishers, also known as broadcasters, send information through the network via objects to interested parties who have registered their interest to the global notification service 1201 via subscriptions.

A broadcaster wraps the affected object within an event 1202 and places this event onto the Global Notification Service's event queue 1203. The event will eventually be removed from the event queue and the category determined. Once the category is determined all the subscriptions within the global subscription cache (GSC) 1204 are extracted and the process of comparing is performed. The compare process 1205 may be run in parallel utilizing lightweight process such as threads for more effective utilization of multiprocessor CPUs.

Once it has been determined that a subscription deems the affected object to be an OOI, then all the Subscribers that have that subscription (the Subscription Group) need to be notified. The event, the affected object and the conditional subscription's key are put onto event queues 1206, 1207 of each of the Local Notification Services for all the subscribers in the Subscription Group. The "take thread" of each queue removes the event from the queue and interrupts the PE of the LNS with the event. LNS's 1208, 1209 using the conditional subscription key as a lookup key, find the Subscription Group whose members are to be notified and calls each subscriber's handleNetworkEvent( ).

Data Layer

Figure 13:
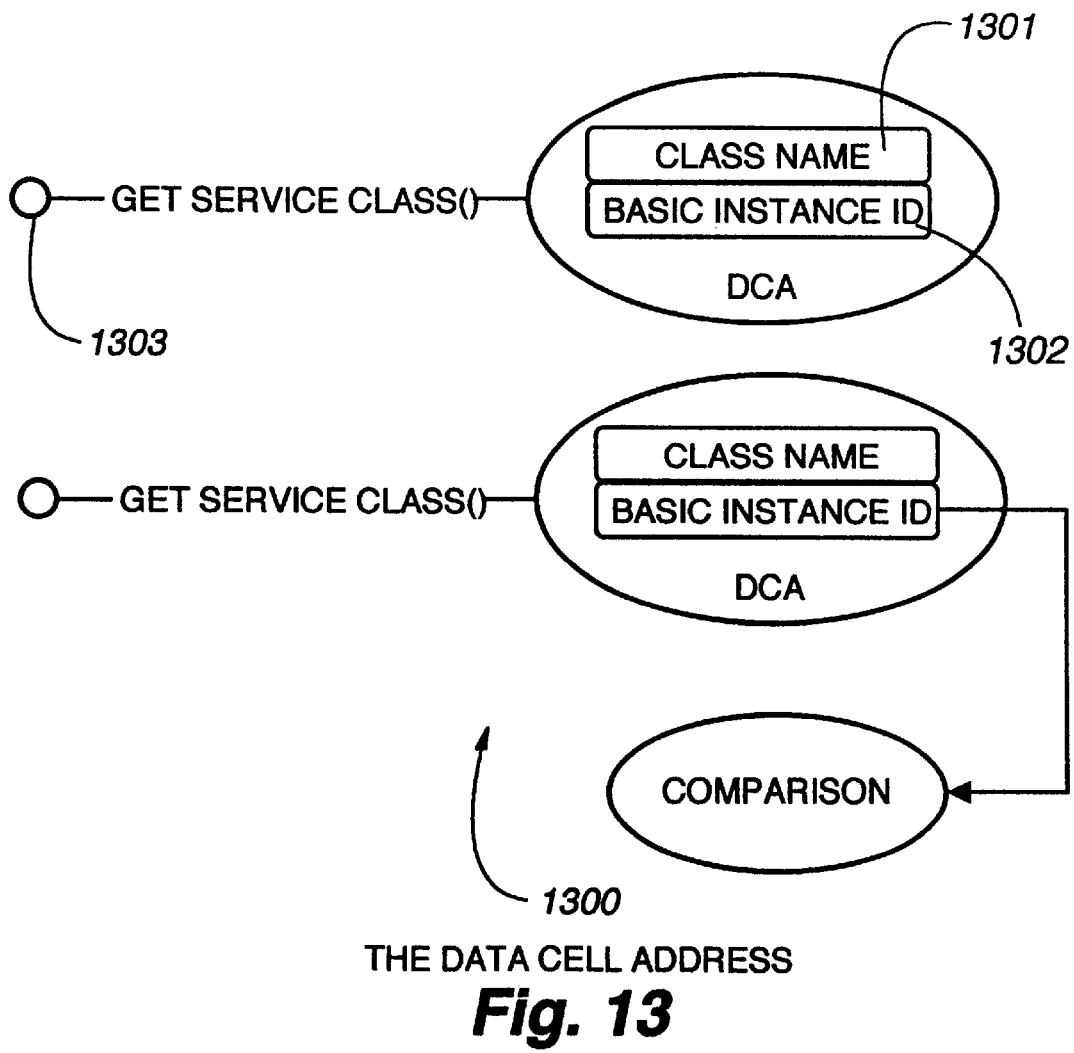
FIG. 13 is a diagram of a data cell address.

As shown in FIG. 13, a data cell address (DCA) 1300 is an application wide unique address used to identify objects by their classification and content or instance of data. The information transmitted throughout the communications layer 101 requires both classification and content; therefore, tagging objects with an address that carries its classification and content description makes the content readily available for searching, subscription and broadcast services. DCA 1300 contains three components: a classification or class name attribute component 1301, a content descriptor (known as the instance id) 1302, and a getServiceClass method 1303 which returns the service object class that is responsible for maintaining the content of the data described. Class name attribute 1301 is a string that identifies the classification of the object that holds the data. Instance id 1302 is an arbitrary object that uniquely identifies the content within the class of objects specified by the classification.

GetServiceClass( ) 1303 is a method that returns a string identifying a class of object that can be used to either create or modify the content specified by the instance id and classification. DCA 1300 uses strings in describing the class attributes so that other software modules within the application need not be required to have the software specified by these classes pre-loaded. When used in conjunction with a dynamic software distribution system such as the one described in this specification, new DCA's may be introduced to a running application without the need for restarting the application. The two attributes and method of a DCA combine to create a content description, its access methodology, and a creator without actually providing the data content itself Furthermore, when an instance id of a DCA implements a comparison interface, the instance id may be used as a subscription for the purpose of data exchange.

Figure 14:
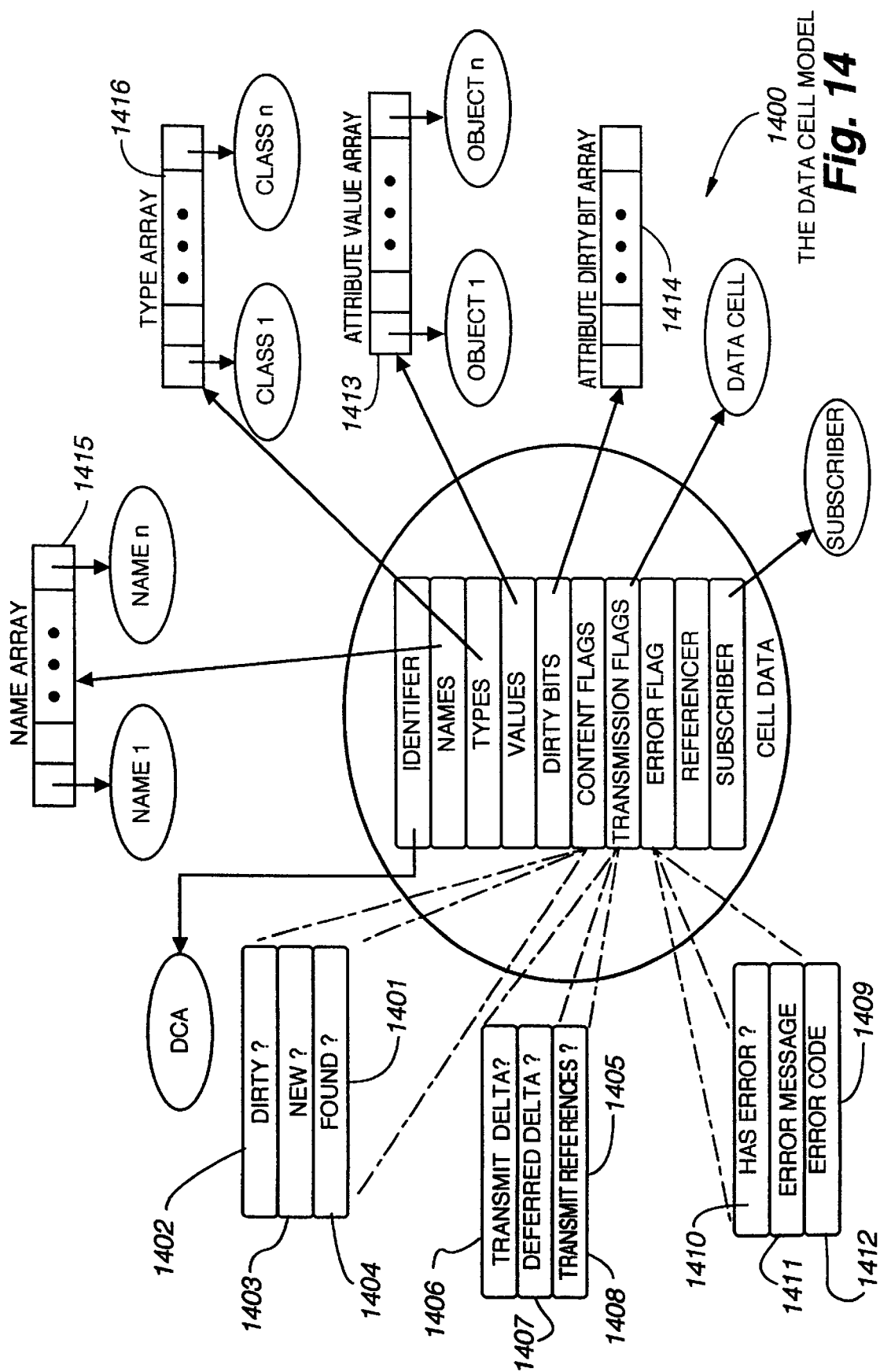
FIG. 14 is a diagram of a data cell model.

As shown in FIG. 14, a data cell (DC) 1400 is a specialized object that may used to maintain information, which is in the form of an object, synchronized throughout an entire application. Data cell 1400 may be stored in a computer-readable medium for subsequent transmission. Data cell 1400 uses DCA 1300 to uniquely identify information and to create subscriptions for modifications to that data using the kernel push conduit communication model. Data cell 1400 contains the content described by DCA 1300. DC 1400 also contains attributes for managing and distributing the content. These attributes are divided into three different groups of flags. Content flags 1401 specify whether the object contains dirty content 1402 (content which has not yet been synchronized), new content 1403 (content that has been newly formed), or no content 1404 (usually the result of search that produced no content yet is not in error).

A transmit flag group 1405 specifies how the content should be broadcast for the purpose of synchronization. A transmit delta flag 1406 specifies that when the data is transmitted the kernel may send just the changes to the content or whether it must transfer the entire content. A deferred delta flag 1407 is used in conjunction with transmit delta flag 1406 and is used to denote that the entire content must be sent to the GNS but that only a delta is required for each end subscriber. This is most often the case when the data is being used by the GNS for comparisons. However, it is left to the differing data cell subclasses to determine whether transmit deferred has valid meaning. The last of this group is the transmit references 1408 and is used to denote that objects to which this object has references within the value array should also be transmitted. Error flags 1409 are used to denote that a particular content is in a state of error 1410, where the error message 1411 is a string representation of the error code 1412 which is a arbitrary number representing the reason for the error condition.

A value array 1413 contains the contents of the data while the dirty bit array 1414 is a matching array of flags that denotes whether data in the value array 1413 has changed since it was last synchronized. The name array 1415 lists the names of each value. The type array 1416 contains the corresponding expected type of each value. In order to handle synchronization of common data cells 1400 throughout an application, DC 1400 keeps a reference to a subscriber. Depending on the type of data, the subscriber takes broadcast events from a notification service and update the content of the data cell.

Figure 15:
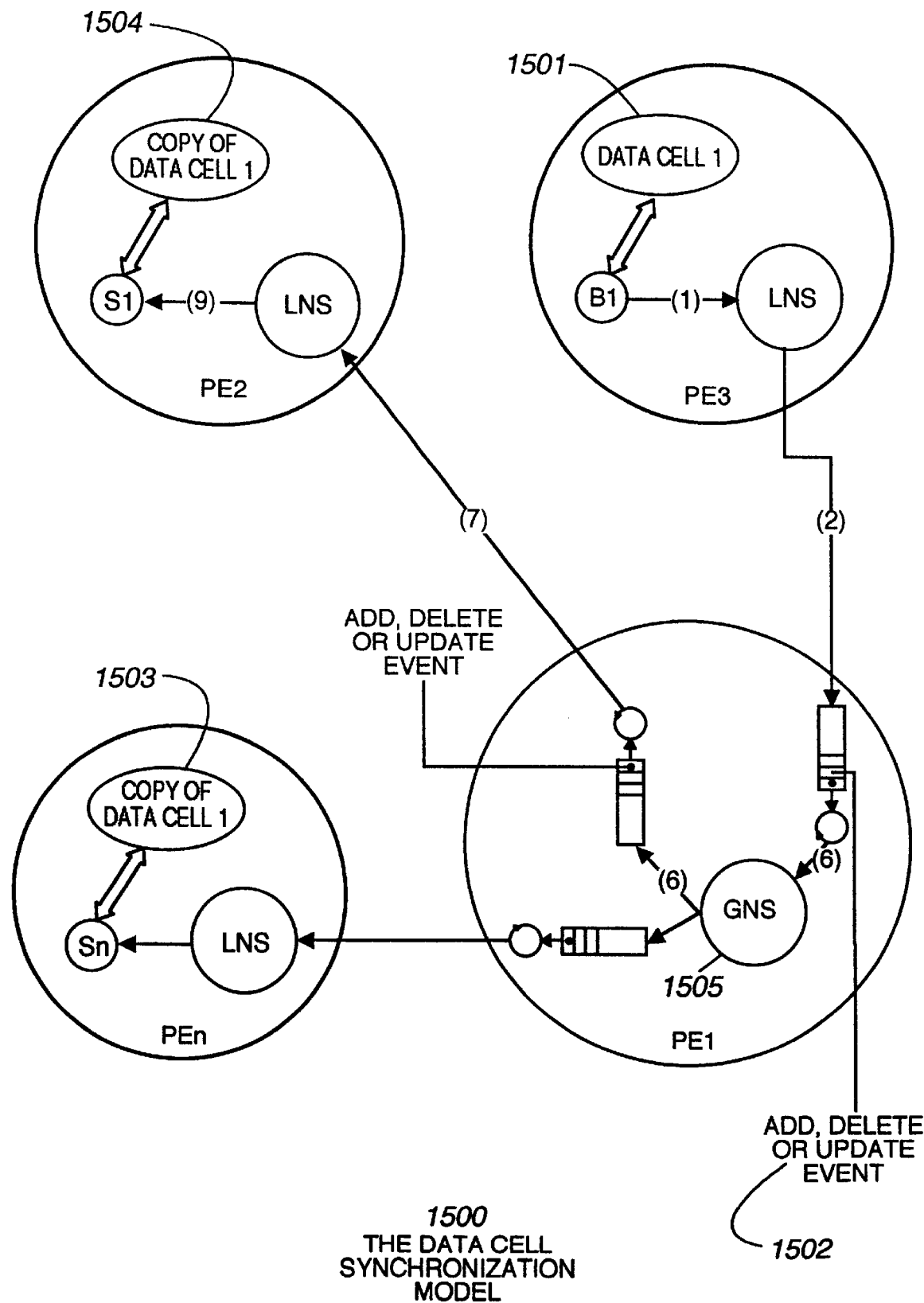
FIG. 15 is a diagram of a data cell synchronization model.

As shown in FIG. 15, the process of synchronizing data cells uses specialized broadcast events. These events provide instructions between data cells on how to update content. This is modeled after a "stimulate and respond" system. Changes to a data cell 1501 stimulate a broadcast that will be responded to by updating its content. This in turn may generate more stimulation from the updated object. In many cases functional processing is done during the update process that may also be seen as functional processing on the transition of data change, implementing a network wide state transition machine. In particular, three events 1502 are defined by the synchronizing operations of a data cell: ObjectAdded, ObjectUpdated, and ObjectDeleted.

These events are processed similar to other broadcast events such that the Object Affected is the either the full content, changed content, or the DCA of object to be deleted. In order for objects 1503, 1504 to be notified of updates they are registered as subscribers with their respective LNSs 1504 and 1505. In turn, LNSs 1504 and 1505 are registered with the subscriptions on behalf of objects 1503, 1504 in the Global Notification Service 1505 as subscriber proxies on behalf of their respective subscribers S1 and Sn within the GNS 1505. The instance id of the DCA serves as the data cell's comparison object and is passed onto the notification service as the subscription, assuming an object makes a request that the data cell should be maintained up-to-date with its counterparts in the network. Data cell 1501 not only manages its own data content but also notifies other objects

1503, 1504 using the data that the content has changed. In addition, the values contained in the attribute value array may contain references to other data cells, in which case the parent data cell maintains updates for all the objects; this is commonly referred to as data cell referencing and relates to contextual processing.

Figure 16:
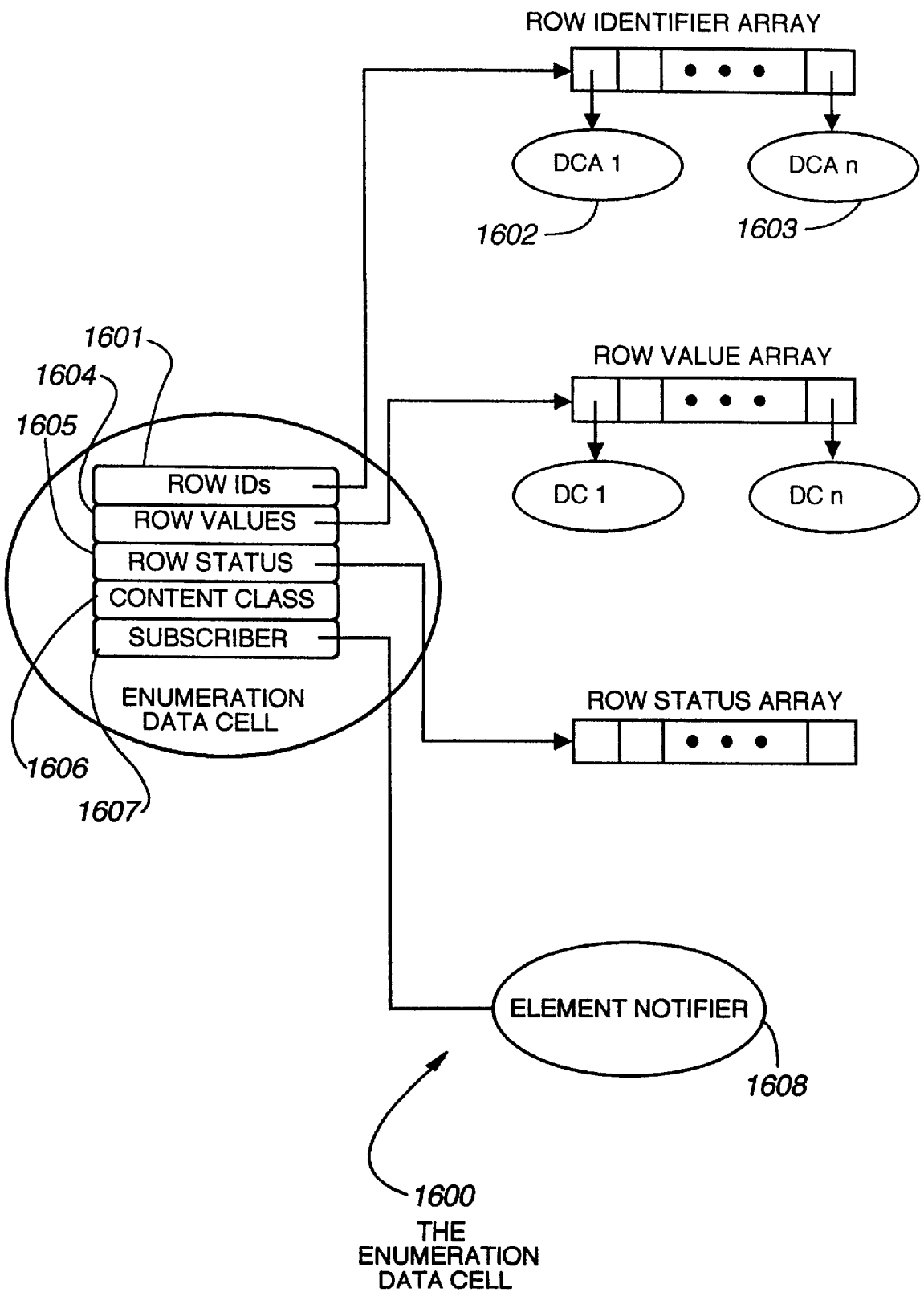
FIG. 16 is a diagram of an enumeration data cell.

One of the types of data cells in the kernel is known as an enumeration data cell 1600, shown in FIG. 16. Enumeration data cell 1600 may be stored in a computer-readable medium for subsequent transmission. This subclass of the data cell provides a list of content in which each row of the list is of the same classification and matches the same comparison defined with the DCA of enumeration data cell 1600. More specifically, if a DCA's instance id is a comparison it is often the case that the data content is a list. This is because the content may have one or more data cells that may match the condition of the comparison specified as the instance id. The enumeration data cell contains an array of rows in which each row contains a pointer to another data cell, which could be another enumeration data cell.

A row identifier array 1601 contains a list of corresponding DCA's 1602, 1603 for the rows of data and is used so that each data cell in the row may be subscribed to for changes, such as an add, update or delete operations. A content class 1606 provides the class specification of the data held within row values 1604. A particular attribute of the enumeration data cells is that all row values must be of the same class. Furthermore, in order to provide synchronization, the enumeration data cell provides more than just a dirty bit for its values. It provides a status flag for each row status 1605; the status may be one of either added, updated or deleted. The flags are important because as the content of a particular data cell within the list's content changes, it is required to remove the data cell from the list when that new content no longer meets the criteria of the DCA. Alternatively, a DCA may be added to the list if its content-change causes it now to meet the specified criteria. Any changes within an enumeration data cell are broadcast using an ObjectUpdatedEvent where the row status is passed along with the object to provide instruction to subscribers on how to synchronize their local copies. The synchronization method that handles these notifications is known as an element notifier 1608. Every data cell contained in an enumeration data cell in turn has a subscription to it that specifies the element notifier as a subscriber 1607. In this way, updates to individuals data cells in turn cause updates to the whole enumeration data cell.

Figure 17:
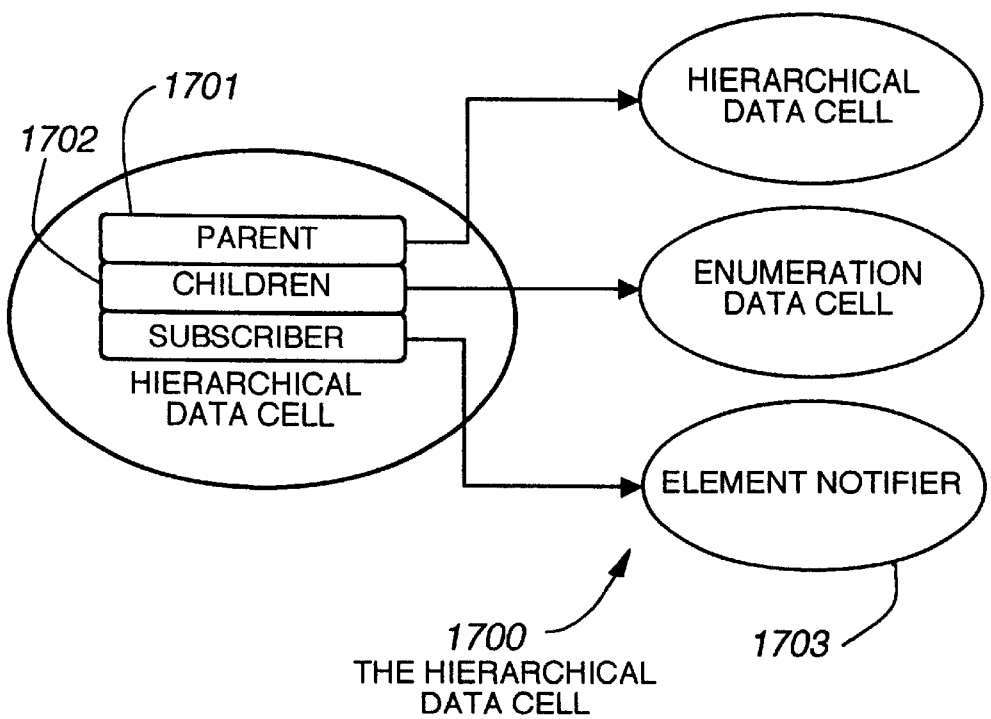
FIG. 17 is a diagram of an hierarchical data cell.

As shown in FIG. 17, a hierarchical data cell 1700 is another implementation of a data cell that provides a mechanism to handle content within a hierarchy or hierarchical structure. Hierarchical data cell 1700 may be stored in a computer-readable medium for subsequent transmission, and it is similar to enumeration data cell 1600. However, the row values are considered the children 1702 of the current cell and hierarchical data cell 1700 contains a pointer up to its parent cell 1701. The element notifier 1703 is similar to element notifier of the enumeration data cell.

Service Layer

Figure 18:
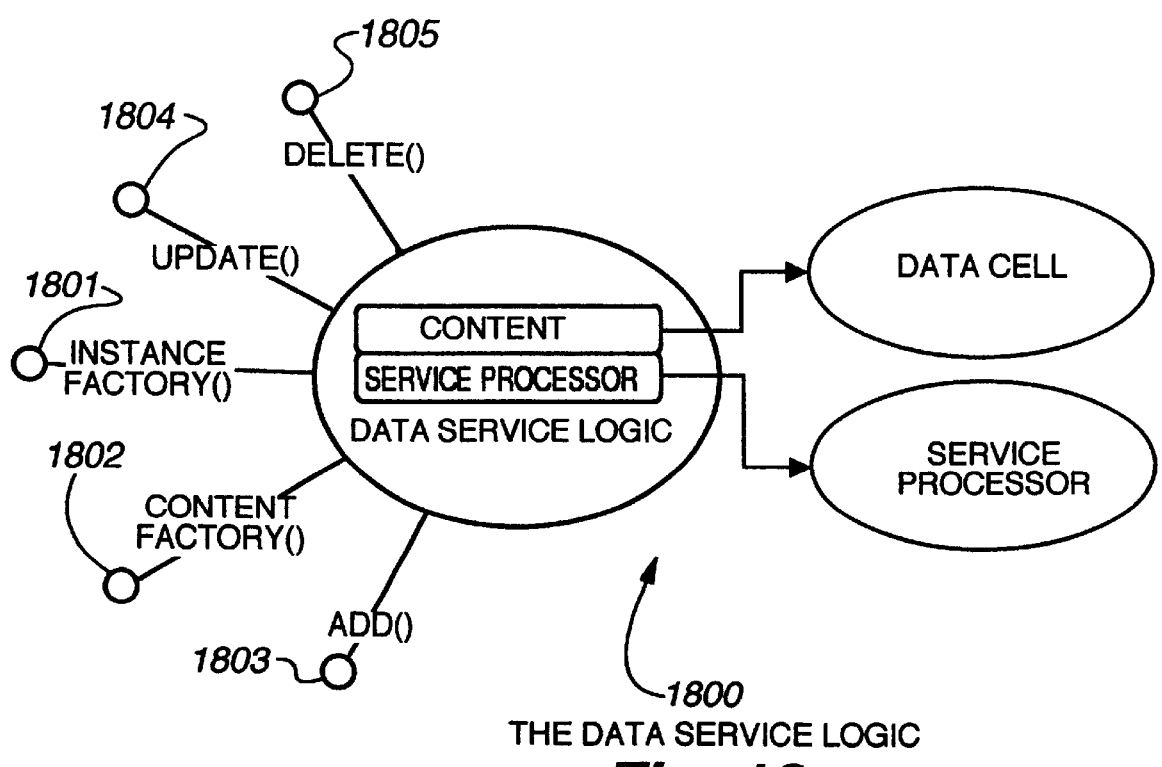
FIG. 18 is a diagram of data service logic.

As shown in FIG. 18, a data service logic (DSL) 1800 provides a model of ownership for data cells within a network. This ownership is provided so that there is a common location for transactions on data. Although the kernel allows for as complex a remote distributed processing model as is desired, data service logic 1800 is designed to reduce complexity by defining only five functions which are normally coded by application developers to provide business rules and functions for applications. The first function is defined as an instanceFactory( ) function 1801. This function is used when ever a new DSL is created, and it differs from that standard constructor in that it is invoked by a data service manager (DSM) in order to create a template which is then used to create an instance the DSL. This factory model is used to overcome the inherent limitations of creating instances of objects using static functions in which the object's definition is known only by a string name. The next function is contentFactory( ) 1802, which is called by a DSM when the DSM requests that the DSL fill in the instance object with the data specified by the DCA. The other functions add( ) 1803, update( ) 1804, and delete( ) 1805 are primarily left to an application developer to implement as appropriate for a particular purpose; however, the general rule is an add function persistently saves the data cell, an update function changes the content of the data cell, and a delete function removes the content of the data cell. The DSL provides the interface for the above functions, and the application developer provides what behavior the functions will have depending upon the data.

Figure 19:
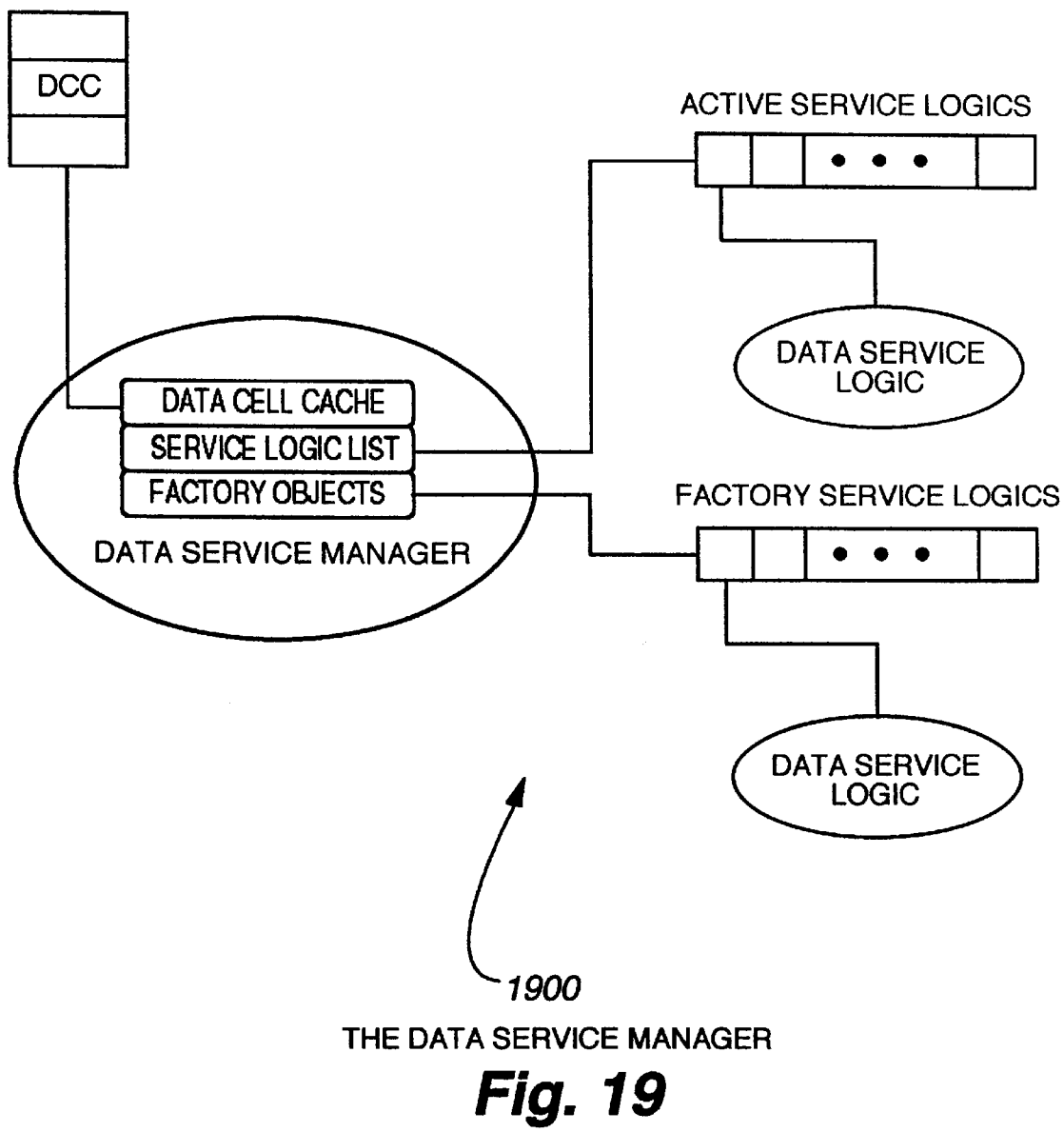
FIG. 19 is a diagram of a data service manager.

As shown in FIG. 19, a data service manager 1900 is a particular type of service processor in an application that handles services for data cells. Its primary function is to provide the finder and creator services for a collection of related DSLs. The DSL on a PE requests of an application naming service (ASN) to return a remote reference to data service manager 1900 that is capable of processing the object class returned by a DCA getServiceClass( ). The requesting DSL executes a remote call to the DSM of a second PE. If the DSM has a DSL capable of processing the data cell requested by the DCA then it is returned; otherwise, the DSM attempts to create a new instance of the DSL in order to have it create the data cell requested by the DCA. In order to create a new DSL, the DSM must have a factory object. This is done so that the DSM does not require pre-knowledge of the software when creating DSLs, thereby allowing new DSL software to be dynamically added to the system. Once a factory object is created using the getServiceClass( ) of the DCA, a new instance is created from the factory object which will be used to create and manage the data cell content using the functions provided by the DSL.

Event Context Model

FIG. 20A is a diagram of a event context model illustrating nomenclature 2000 for implementing various operations. The operations and events shown in FIG. 20A are transmitted, for example, using the data cells or objects within the network described above; however, they may also be transmitted using other types of entities. This example includes a publisher entity 2001 and three subscriber entities, each containing data cells. Subscriber 1 includes three data cells 2017 ($D_{y'}$), 2018 ($D_y$), and 2019 ($D_x$). The indentation of the data cells indicates which data cells reference other data cells. For example, data cell $D_x$ (2019) references data cell $D_y$ (2018), which references data cell $D_{y'}$ (2017). As shown, publisher 2001 transmits an operation 2020 ($O_p[D_x[D_y[D_{y'}]]]$), which includes delta content for data cells $D_x$, $D_y$, and $D_{y'}$, and the delta content may include the delta information discussed above. The operation may include one of the four operations discussed above and in FIGS. 24–27. The naming service receives operation 2020 and finds corresponding service object 2002 ($S_x$) for data cell $D_x$. This naming service may include those naming services identified above.

Service object 2002, upon receiving operation 2020, does not have the capability to perform operation 2020 because it includes data cells for which service object 2002 does not perform processing. In particular, service object 2002 only performs processing for data cell $D_x$. Therefore, service object 2002 splits the operation in order to generate operation 2008 ($O_p[D_y[D_{y'}]]$) and remove delta $D_x$ from operation 2020. Service object 2002 transmits operation 2008 to service object 2003 ($S_y$) corresponding to data cell $D_y$.

Service object 2003, upon receiving operation 2008, does not have the capability to perform operation 2008 because it includes data cells for which service object 2003 does not perform processing. In particular, service object 2003 only performs processing for data cell $D_y$. Therefore, service object 2003 splits the operation 2008 in order generate operation 2009 ($O_p[D_{y'}]$) and remove delta $D_y$ from operation 2008. Service object 2003 transmits operation 2009 to service object 2004 (Sy) corresponding to data cell $D_{y'}$.

Service object 2004 performs operation 2009, and it transmits an event 2012 ($E_p T_y D_{y'}$) to any object referencing data cell $D_{y'}$. Along with the event it includes a context ($T_y$) indicating that it performed the operation under context $T_y$, since it received operation 2009 from service object $S_y$ (2003). The context in the event is typically implemented by a flag or string name. Data cells referencing data cell $D_{y'}$ include data cells 2013, 2015, and 2017 within the subscribers. The corresponding subscriber machines perform the operation in the event. In particular, subscriber 3 performs the operation, updates the data, and terminates the context, as indicated by the corresponding terminate line. Data cell 2013 determines that it is referenced by data cell 2014 and, since event 2012 included a transaction $T_y$, data cell 2013 terminates the event. Since data cell 2014 will also receive an update, data cell 2013 need not notify the user.

Next, in subscriber 2, data cell 2015 receives event 2012, updates the data, and notifies the user, as indicated by the notify line. Subscriber 2 provides an example of non-normalized data, indicating an error. In subscriber 2, data cell $D_x$ directly references data cell $D_{y'}$. For normalized data, data cell $D_x$ should reference data cell $D_{y'}$ through a reference to data cell $D_y$. Finally, in subscriber 1, data cell 2017 receives event 2012 and implements the operation, but does not notify the user, since data cell $D_{y'}$ (2017) determines that it is referenced by data cell $D_y$ (2018). Examples of notification include presenting information on a display device, activating a peripheral device, or activating a cellular phone.

Service object 2004 also returns a data cell $D_{y'}$ (2021) to service object 2003. Data cell 2021 provides results of the operation performed by service object 2004 and indicates that service object 2004 has performed the operation.

Service object 2003, having receiving data cell 2021 including the results of the operation for data cell $D_{y'}$, executes operation 2008 and transmits a corresponding event 2011 ($E_p T_x D_y$) to data cells referencing $D_y$. Service object 2003 includes a context ($T_x$) in event 2011, since it received operation 2008 from service object 2002. In subscriber 3, data cell 2014 receives event 2011, and, knowing it is not referenced by another data cell, performs the operation, updates the data, and notifies the user as indicated by the notify line. In subscriber 1, data cell 2018 receives event 2011, performs the operation, and updates the data, but it does not notify the user, since it is referenced by data cell 2019. Service object 2003 also transmits a data cell $D_y$ (2022) to service object 2002. Data cell 2022 includes results of the operation and indicates that service object 2003 has performed the operation.

Service object 2002, having received data cell 2022 including the results of the operation for both data cells $D_y$ and $D_{y'}$, performs operation 2020 and transmits event 2010 ($E_p D_x$) to data cells referencing data cell $D_x$. Service object 2002 did not perform the operation under a context and therefore does not include a context in event 2010. In subscriber 2, data cell 2016 performs the operation, updates the data, and notifies the user. Since, in this example, subscriber 2 includes non-normalized data, the user is notified twice of the same event. In subscriber 1, data cell 2019 receives event 2010, performs the operation, and updates the data. Also, since data cell 2019 is not referenced by another data cell, it notifies the user of the event.

As the events are broadcast, the Notification Services know that publisher 2002 originated the change, the events will not be sent to the data cell 2001 throughout the process.

Processing of Various Layers

Figure 20B:
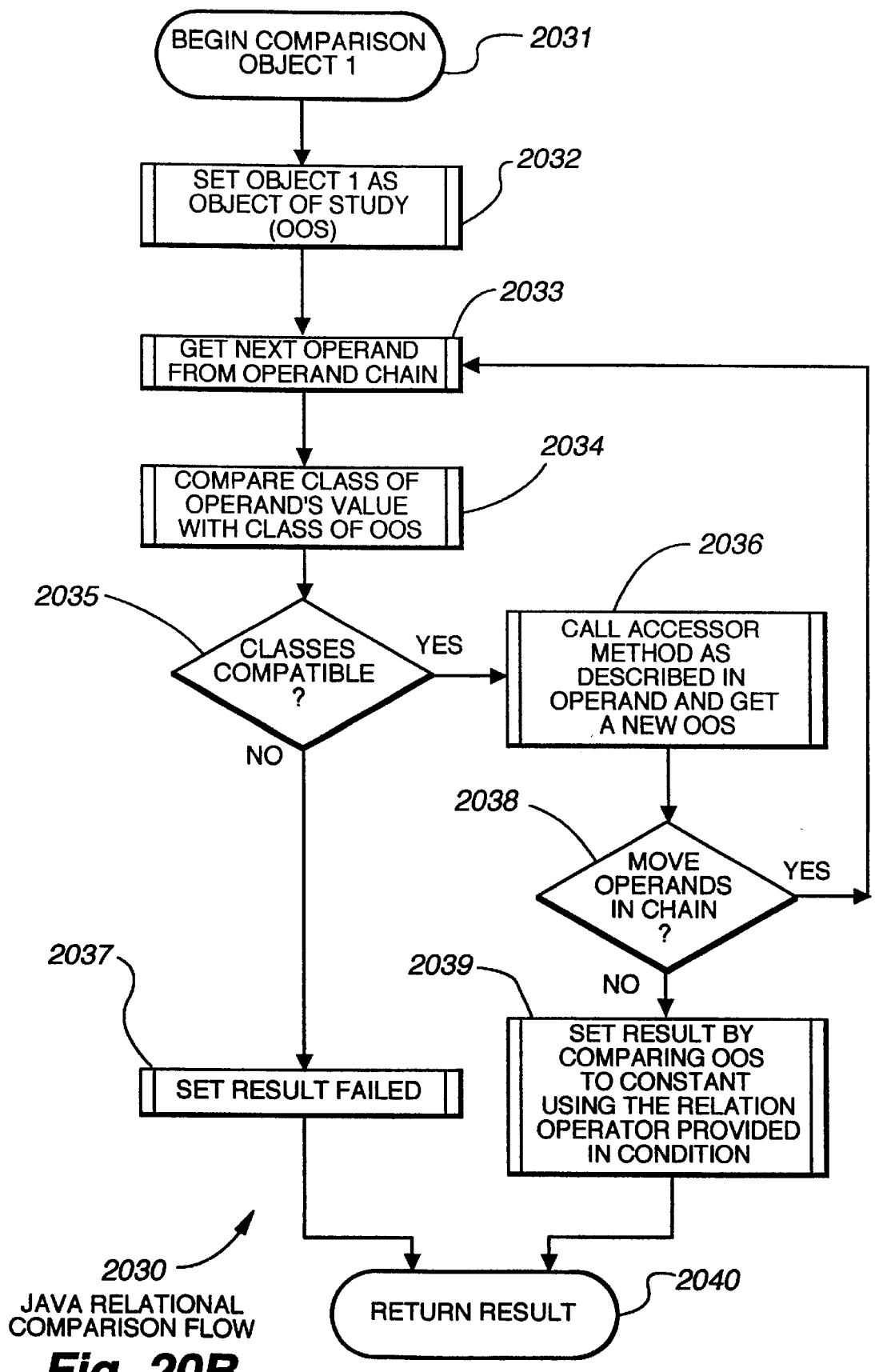
FIG. 20B is a flow chart of a method for a relation comparison's attribute extraction.

FIG. 20B is a flow chart of a method 2030 for a relation comparison's attribute extraction, executed within communications layer 101. In method 2030, the system, implemented with the PEs and related objects described above, begins a comparison of an object 1 (step 2031). It sets object 1 as the Object of Study (step 2032) and retrieves the next operand from an operand chain, specified by a one more related operands in the object (step 2033). The system compares the class of the operand's value with the class of the Object of Study (step 2034), and it determines if the classes are of compatible types (step 2035.) If they are not compatible, the system sets the result to failed (step 2037). Otherwise, if the classes are of compatible types, the system calls an accessor method as described in the operand and retrieves a new Object of Study (step 2036). The systems determines if more operands exist in the chain of operands (step 2038) and, if so, it returns to step 2033 to process the next operand. If no more operands exist, the system sets the result by comparing the Object of Study to a constant using a relation operator provided in the condition (step 2039) and returns the result (step 2040).

Figure 21:
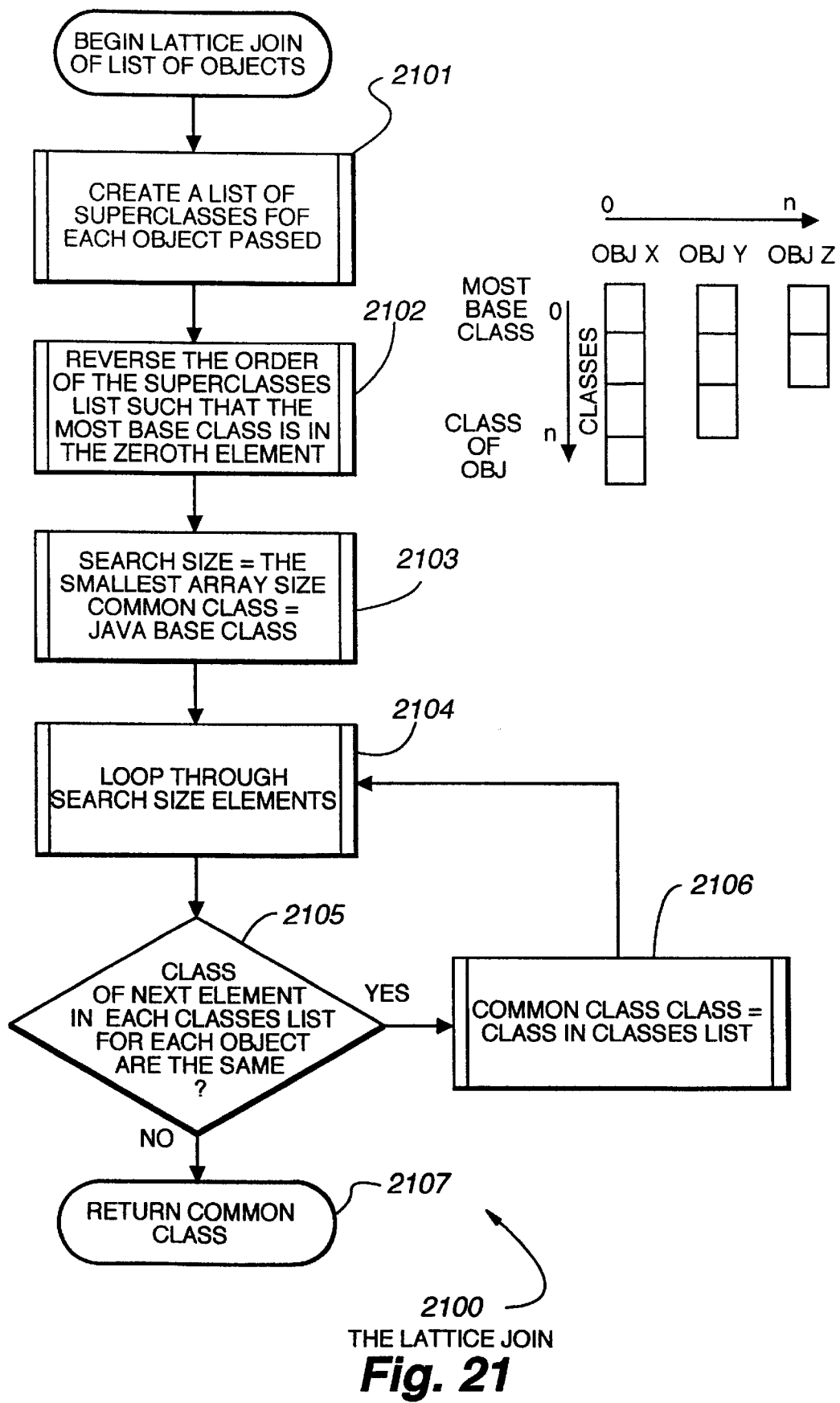
FIG. 21 is a flow chart of a lattice join method.

FIG. 21 is a flow chart of a lattice join method 2100, executed within communications layer 101. In method 2100, the system, implemented with the PEs and related objects described above, creates a list of superclasses for each object passed (step 2101). The system reverses the order of the superclasses list such that the most base class is in the "zero" element (step 2102), and it sets a searchSize parameter to the smallest array size and sets a common class parameter to the Java base class (step 2103). The system loops through the searchSize elements (step 2104) and determines if the classes of the next element in each of the classes list are the same (step 2105). If they are the same, the system sets the common class parameter to the class of the next element in the classes list (step 2106) and repeats steps 2104 and 2105. If the classes are not the same, as determined in step 2105, the system returns the common class (step 2107).

Figure 22:
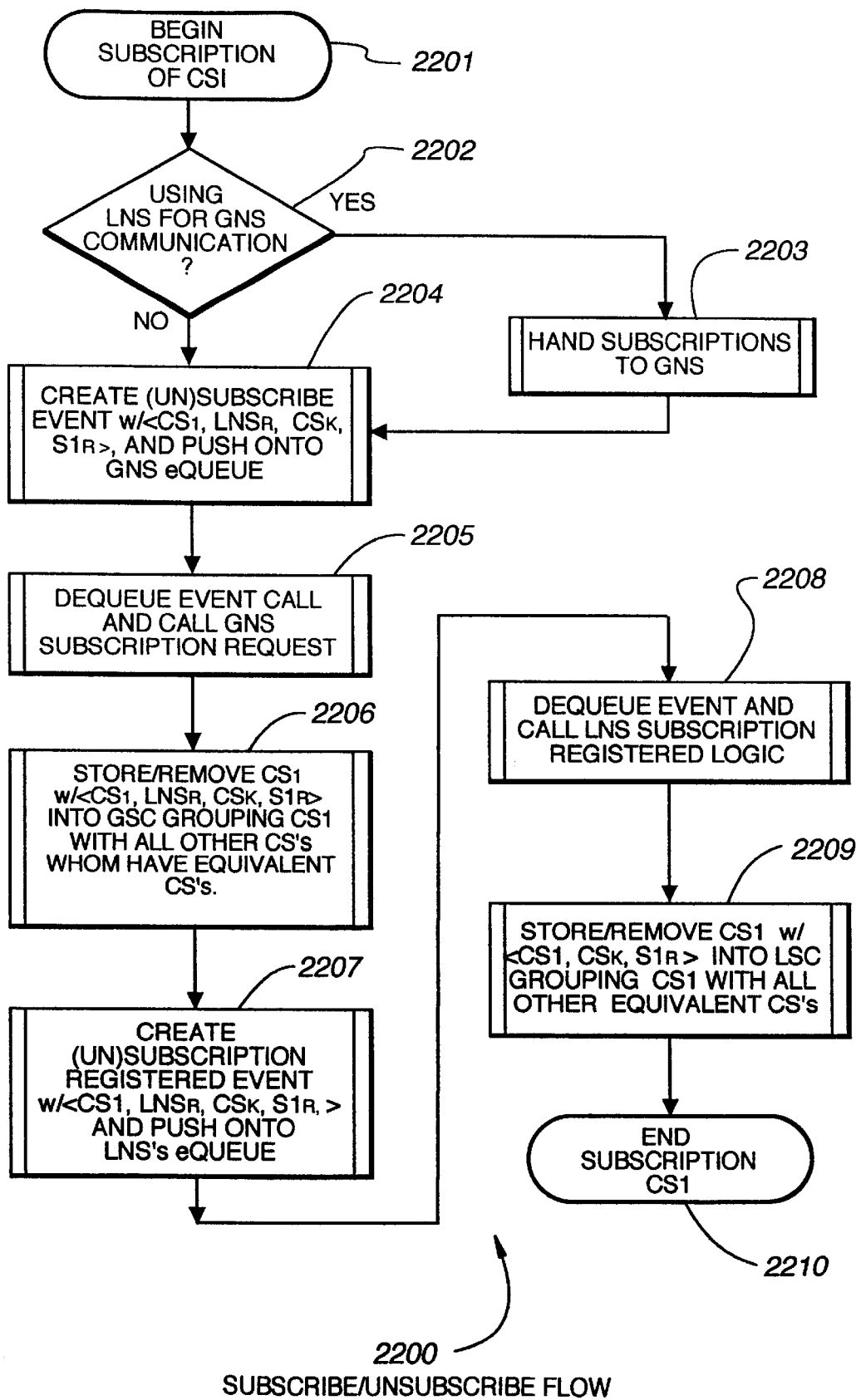
FIG. 22 is a flow chart of a subscribe/unsubscribe method.

FIG. 22 is a flow chart of a subscribe/unsubscribe method 2200, executed within communications layer 101. In method 2200, the system, implemented with components shown in FIG. 10 (shown by the numbers cross-referencing the flow chart in FIG. 22 with the components identified in FIG. 10), begins subscription of $CS_1$ (step 2201) to the LNS. The LNS determines if it is being used for GNS communication, (Step 2202) and if so, it hands the subscription to the GNS (step 2203) and creates a (un) subscribe event with parameters $CS_1$, $LNS_r$, $CS_k$, and $S1_r$, and pushes the event onto the GNS's eQueue (step 2204). The system then dequeues the event and calls GNS (un) subscribe request (step 2205), and it stores/removes $CS_1$ with parameters $LNS_r$, $LNS_{key}$, and $S1_r$ into a GSR grouping $CS_1$ with all CS with equivalent CS's (step 2206). It then creates an (un) subscribed registered event with parameters $CS_1$, $LNS_r$, $LNS_{key}$, $S1_r$ and pushes the event onto LNS's eQueue (step 2202). The system then dequeues the event and calls LNS's (un) subscribe registered logic (step 2207), stores/removes $CS_1$ with parameters $CS_1$, $CS_{key}$, $S1_r$ with LSC, grouping $CS_1$ with all other equivalent CS's (step 2209) and ends the (un) subscribe (step 2210) process.

Figure 23:
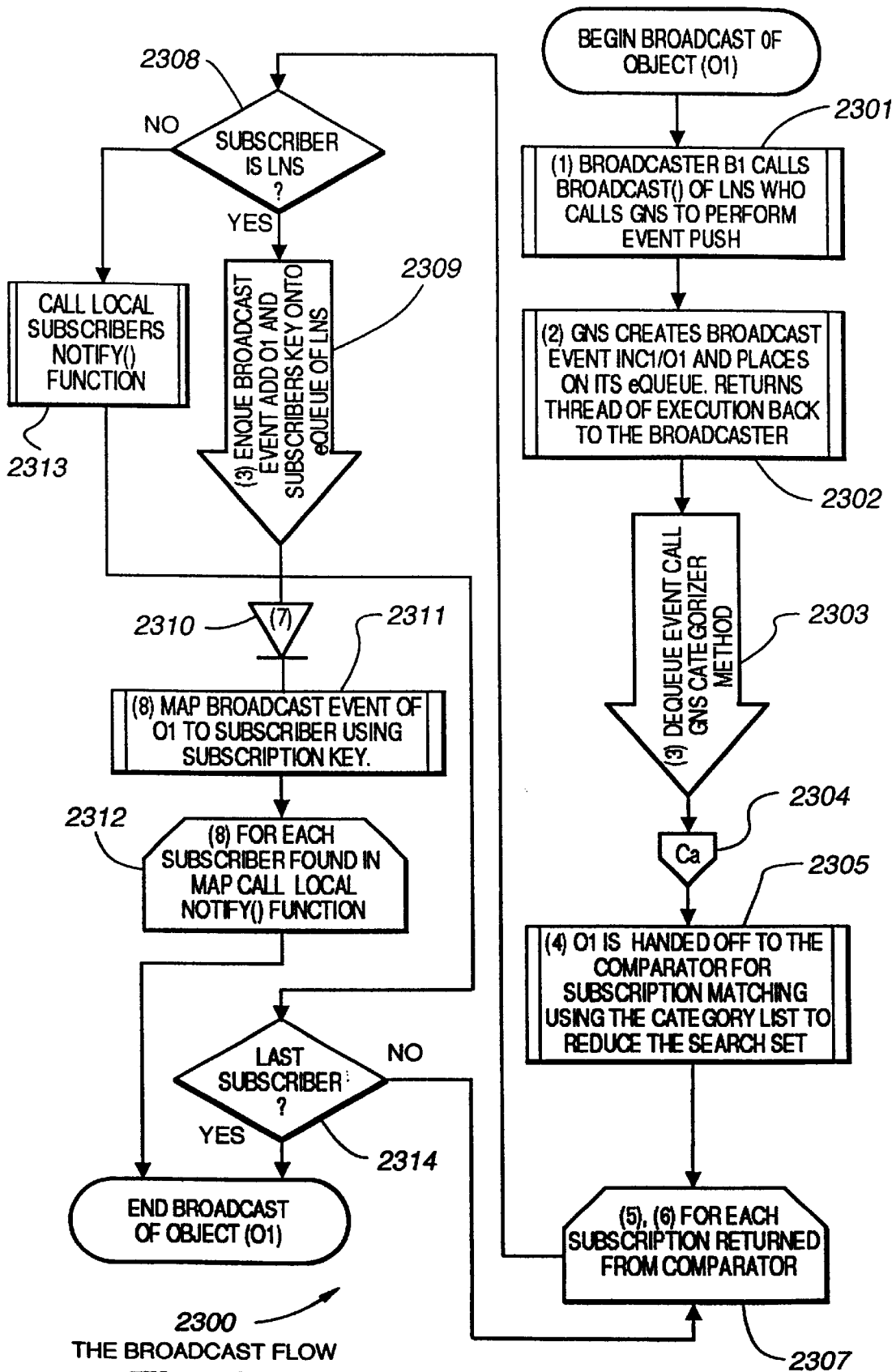
FIG. 23 is a flow chart of a broadcast flow method.

FIG. 23 is a flow chart of a broadcast flow method 2300, executed within communications layer 101. A system for executing method 2300 may be implemented with components shown in FIG. 12 (shown by the numbers cross-referencing the flow chart in FIG. 23 with the components identified in FIG. 12). In method 2300, a broadcaster B1 wraps the object affected in an event 1202 and passes it to the LNS in PE3. The LNS calls the broadcast method of the GSN 1201 to place the event on the event queue (eQueue) 1203. The thread of execution returns to the broadcaster B1 (Step 2301). The eQueue take thread dequeues the event and calls GNS 1201 categorizer method (Steps 2303 and 2304). Object1 is handed off to the comparator 1205 for subscription matching using the category list to reduce the search set (Stepss 2305).

For each subscription returned from comparator 1205, PE1 accesses GSC 1204 and places a corresponding event on event queues 1206 and 1207 (Step 2307.) PE1 also determines if the subscriber is an LNS (step 2308) and, if so, the broadcast event adds object1 and subscribers key onto eQueue 1206 or 1207 of the LNS in PE3 (step 2309); otherwise, PE1 calls the local subscriber's notify function (step 2313). Following steps 2309 and 2313, PE1 in parallel executes step 2314 and steps 2310–2312. In particular, it determines if the processed subscriber is the last subscriber (step 2314) and, if not, it returns to step 2307 to process the next subscriber. In parallel, it also transfers the broadcast events to the LNS in PE 1208 (step 2310). The broadcast event of object1 is mapped to the subscriber in the LSC in PE 1208 using the subscriptionKey (step 2311). For subscriber found in the map the LNS in PE 1208 calls the local notify function (step 2312).

Figure 24:
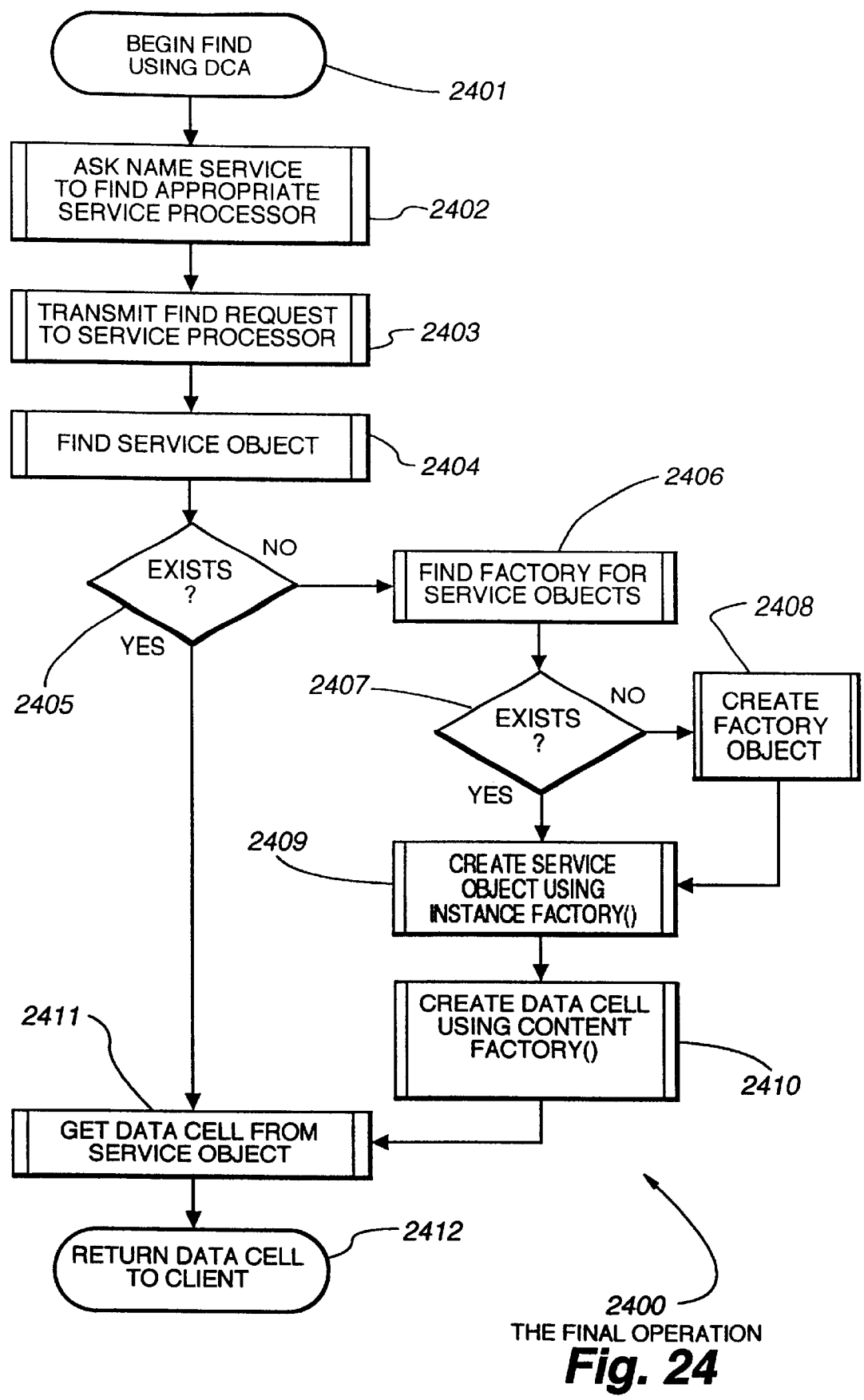
FIG. 24 is a flow chart of a find operation

FIG. 24 is a flow chart of a Find operation 2400, executed within data layer 102 and implemented with the PEs and related objects described above. A Find operation generally involves a client transmitting a Data Cell Address and receiving in response a Data Cell. A client creates a Data Cell Address with the class name and an instance id (usually in the form of a query) that describes the Data Cell in question (Step 2401). The client asks the Naming Service to find a Service Processor that will process that class name (Step 2402). The client then transmits the DCA to that Service Processor to process the find request (Step 2403). The Service Processor attempts to find the Service Object that maintains the Data Cell addressed by the Data Cell Address (Step 2404). If no such Service Object is found, (Step 2405) one is created by finding a factory object based on the class name (Step 2406) or creating one (Step 2408) if none is found (Step 2407). The factory object is used to create the Service Object (Step 2409), the contentFactory( ) method 1802 (Step 2410) is called to populate the Data Cell and the new Service Object is stored. Finally, the Data Cell is retrieved from the Service Object (Step 2411) and returned to the client (Step 2412). The operations (Add, Update, Delete) all start with the client finding the Service Processor and the Service Processor finding or creating the Service Object as described here using the Data Cell Address from a particular Data Cell.

Figure 25:
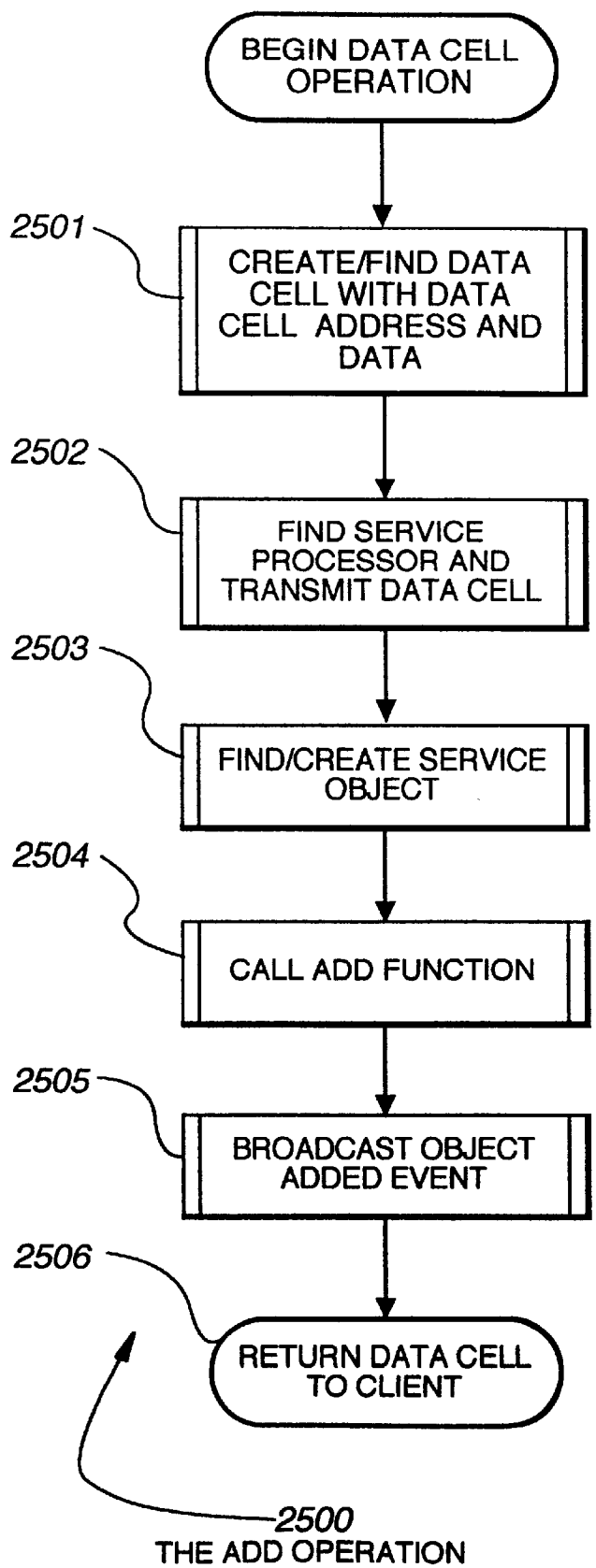
FIG. 25 is a flow chart of an add operation.

FIG. 25 is a flow chart of an Add operation 2500, executed within data layer 102 and implemented with the PEs and related objects described above. An Add operation generally involves the creation of a Data Cell. The client creates a Data Cell or finds one with a Data Cell Address as described for the Find operation (Step 2501). The client then transmits this Data Cell to a Service Object found or created using the Data Cell's Data Cell Address (Step 2502). The Service Processor finds or creates the Service Object (Step 2503). The Service Object performs the Add operation (Step 2504), broadcasts an Object Added event (Step 2505) with the Data Cell and returns any additionally changed data in the Data Cell to the client (Step 2506). The client can then merge those changes with its original copy.

Figure 26:
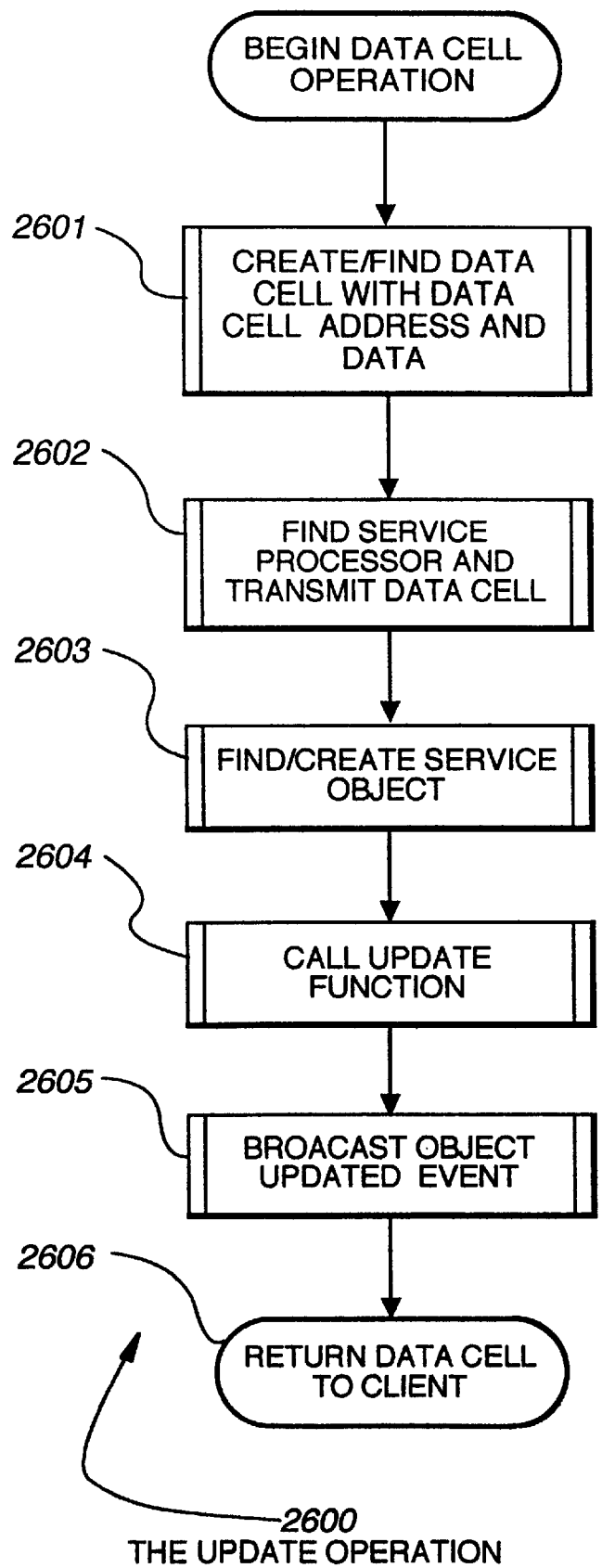
FIG. 26 is a flow chart of an update operation.

FIG. 26 is a flow chart of an Update operation 2600, executed within data layer 102 and implemented with the PEs and related objects described above. An Update operation generally involves updating the values within a Data Cell. The client creates a Data Cell or finds one using a Data Cell Address as described for a Find operation (Step 2601). The client makes some changes to the values in the Data Cell. The client then transmits the changes to the Data Cell to a Service Processor found or created as described for the Find operation (Step 2602). The Service Processor finds or creates the Service Object (Step 2603). The Service Object performs the Update operation (Step 2604), broadcasts an Object Update event (Step 2605) and returns any additionally changed data in the Data Cell to the client (Step 2606). The client may then merge those changes with his original Data Cell.

Figure 27:
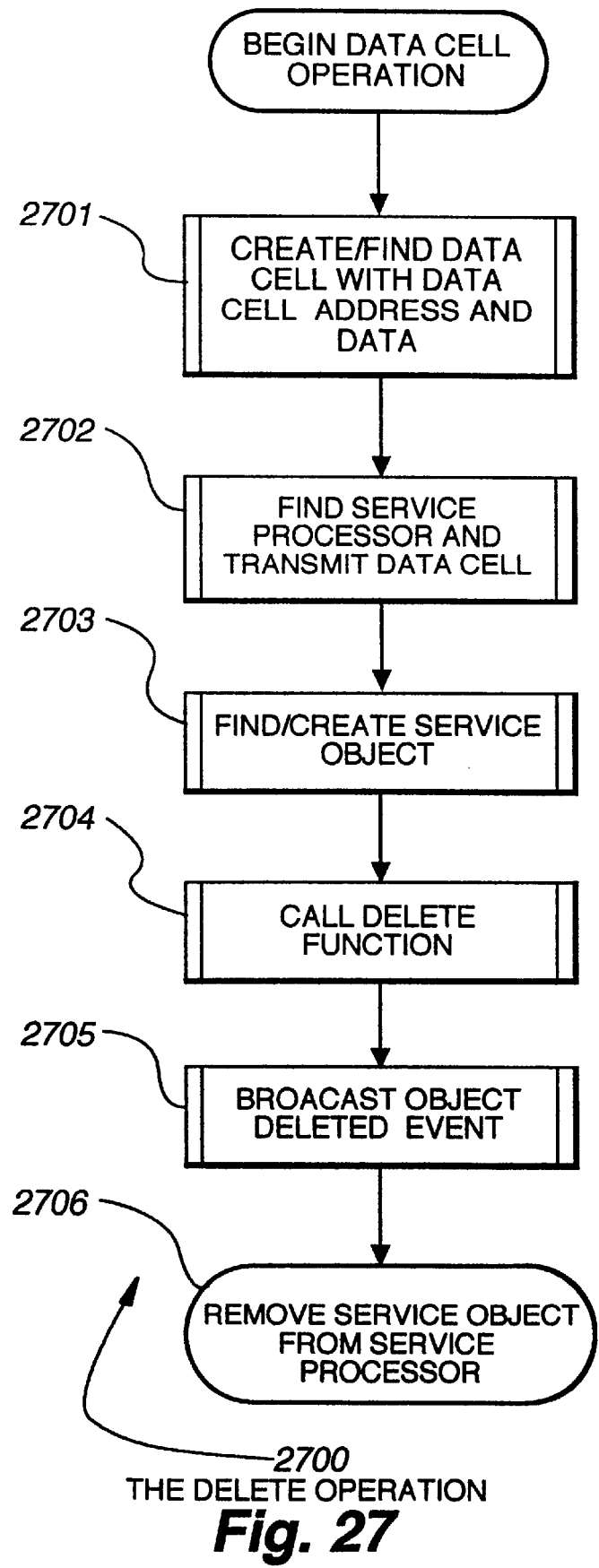
FIG. 27 is a flow chart of a delete operation.

FIG. 27 is a flowchart of a Delete operation 2700, executed within data layer 102 and implemented with the PEs and related objects described above. A Delete operation generally involves removing the Service Object and all copies of the associated Data Cell. The client builds a Data Cell Address (Step 2701) and transmits it along with the Delete request (Step 2702). The Service Processor finds or creates the Service Object (Step 2703). The Service Object performs the Delete operation (Step 2704), broadcasts an Object Deleted event (Step 2705) with the Data Cell Address and then the Service Object is removed from the Service Processor's tables (Step 2706).

Application Layer

Figure 28:
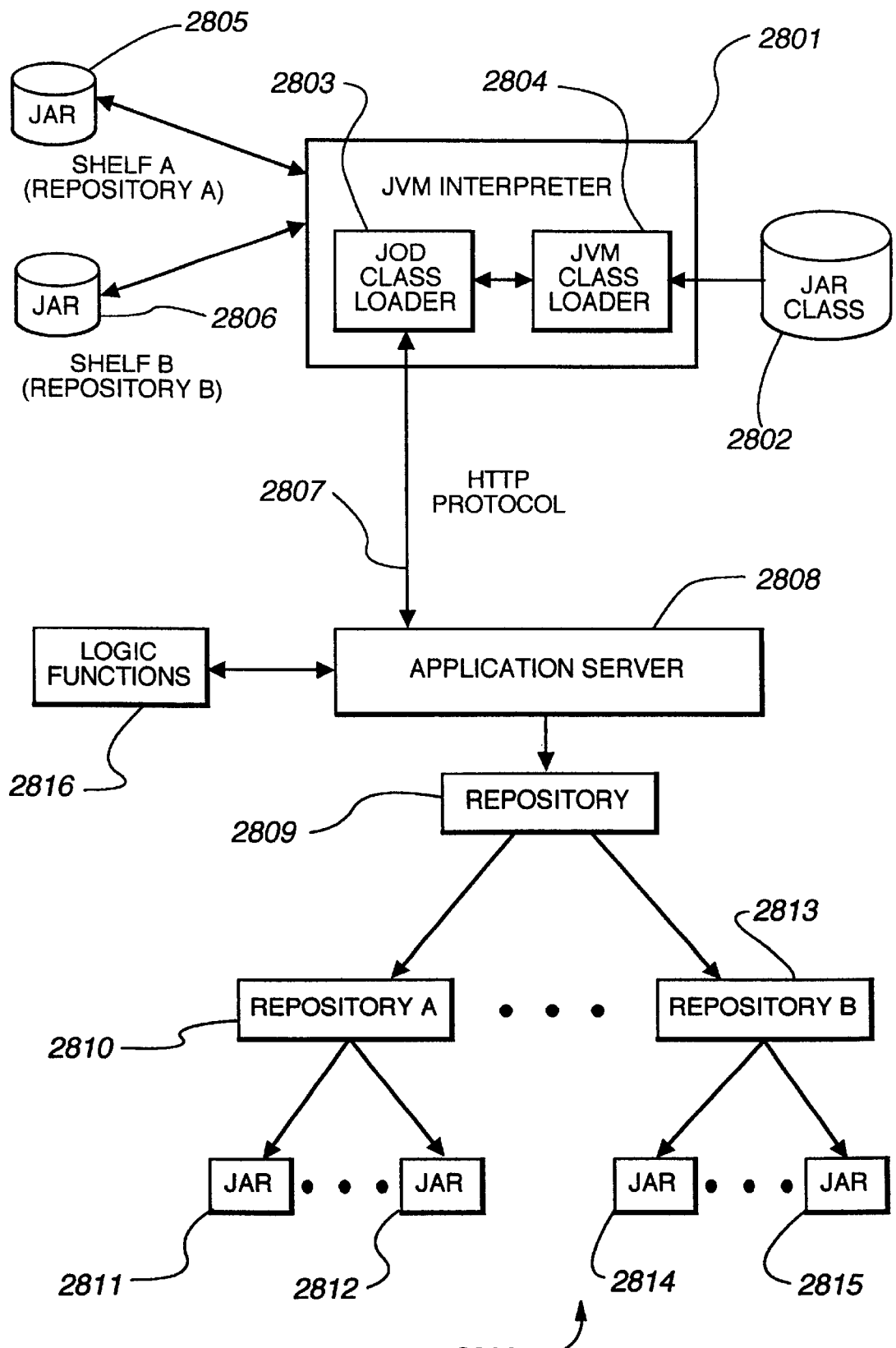
FIG. 28 is a logic diagram illustrating distribution of software in a distributed system.

Application layer 104 involves processing as implemented by methods executed by the PEs. The methods may be implemented in modules including software or firmware for execution by the CPUs of the PEs. FIG. 28 is a diagram illustrating how software or files may be distributed throughout a distributed system, such as that described above, for use by various machines. It may be distributed within a Java On Demand (JOD) system, using global software repository 208 and an application server to tie software to the PEs, thus creating a global community of logic known as an application. In particular, JOD refers to a thin object used to pull software modules into local software repository 206. JOD works in two modes: 1) on-demand mode—in this mode the JOD object pulls software modules into local software repository 206 when class modules are referenced during the actual processing of software, and thus only software modules required are actually downloaded; and 2) pre-cache mode—in this mode the JOD object pulls software modules in to local software repository 206 prior to executing any part of the software.

As shown in FIG. 28, a system 2800 for software or file distribution within application layer 104 includes a JVM interpreter 2801 having a JOD class loader 2803 communicating with a JVM class loader 2804. JVM class loader 2804 receives class information from a database 2802 storing Java archives (jar) classes. JVM interpreter 2801 downloads software from databases 2805 and 2806, which provides for database locations referred to as a shelf A and a shelf B.

JOD class loader 2803 communicates with an application server 2808 using an HTTP protocol over communication link 2807. The Application server 2808 is part of the Application Manager 203 which maintains the mappings of applications with their respective software and which Process Engines are currently handling Service Processors. Thus the Application server along with the Application Manager guarantees that an application and all it's PEs receive and use the same software components during its execution even within a distributed environment. The repositories include a repository 2809 having associated repositories 2810–2813. Each repository 2810–2813 may include a number of jar files for storing software applications. Repository 2810 includes jar files 2811–2812, and repository 2813 includes jar files 2814–2815.

Figure 29:
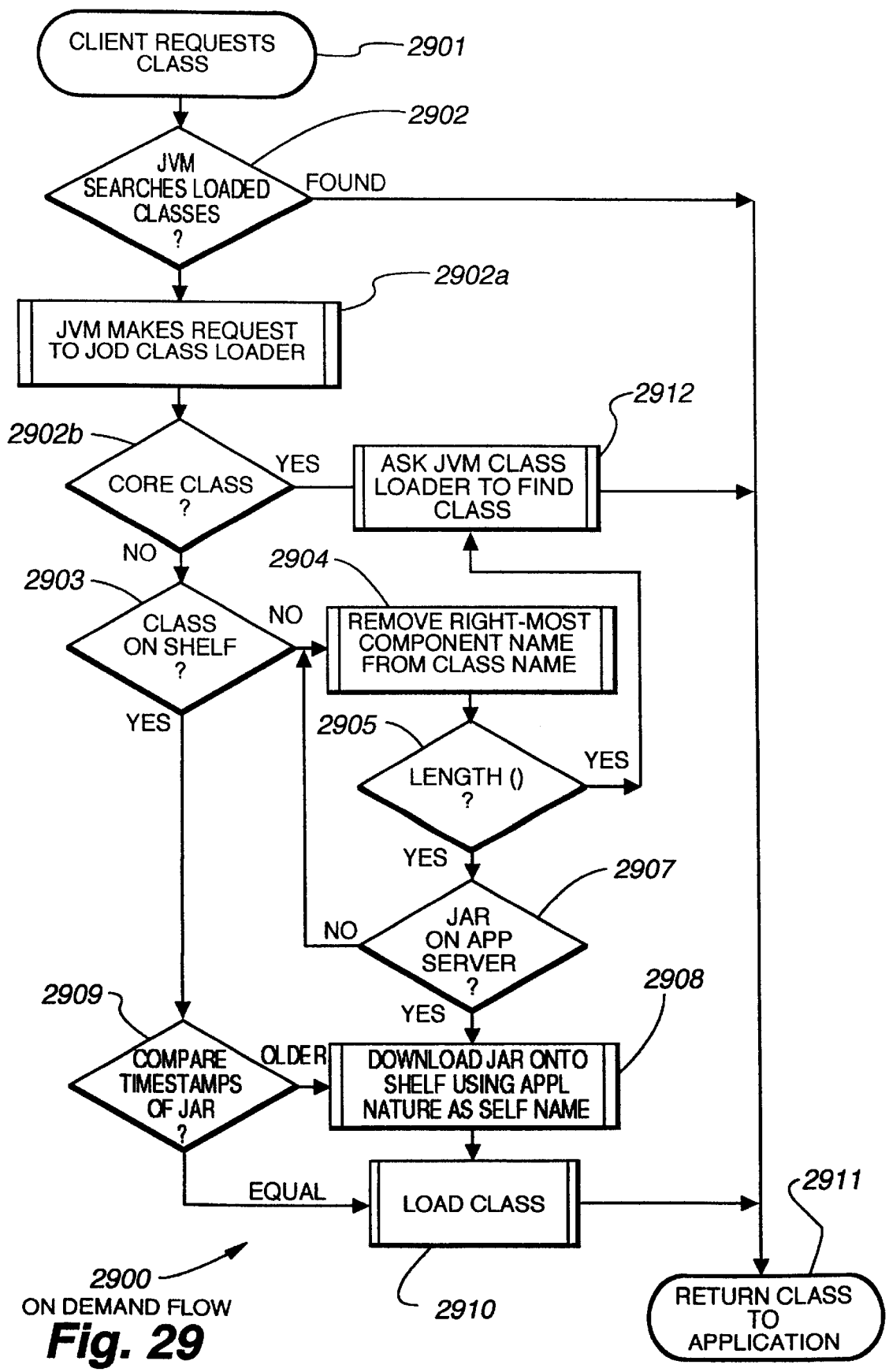
FIG. 29 is a flow chart of a process for implementing the distribution of software in the system shown in FIG. 28.

FIG. 29 is a flow chart illustrating process 2900, executed within the application layer 104, for distribution of software or files in the exemplary System 2800 with the JOD in "on-demand" mode. A client application makes use of a class, either with an explicit reference or a class name (Step 2901). When the JVM 2801 finds that a particular class has not been loaded (Step 2902), it makes a load request to the JOD class loader 2803 (Step 2902a). If the JOD determines that the class is part of the Java core system (Step 2902b), JOD asks the JVM class loader 2804 to find and load the class. If the class is not part of the core, the JOD class loader checks for the class on a local shelf (Step 2903). If the class is found on the local shelf, JOD compares the local time stamp of the corresponding jar 2805 or 2806 with the time stamp of the jar on the server 2811, 2812, 2814, or 2815 using the application's name to find the specific server repository 2810 or 2813 (Step 2909). If the local time stamp is the same, then JOD has the most recent version of the jar. If not, JOD requests a new copy of the jar from the server 2808 and replaces the classes on the shelf (Step 2908). Once the JOD class loader has the class data, the class is loaded (Step 2910) and returned to the application (Step 2911).

If JOD class loader 2803 did not have the class in its repository, as determined at step 2903, it searches for the class. In particular, it removes the right-most component from the class name (step 2904) and determines if the resulting name has a non-zero length (step 2905). If the length is zero, then the server does not have the class, so the JVM class loader 2804 is asked to find and load the class, (Step 2912) this may result in an exception being thrown by the JVM. Otherwise, if the name has a non-zero length, it determines if the resulting jar name is on application server 2808 (step 2907). If not, it continues removing components and searching for the class in steps 2904–2907. If it did find the class on the application server 2808, it downloads the corresponding jar file onto a shelf using the application name as the shelf name (step 2908). The class is loaded into memory (step 2910) and delivered to the application (Step 2911). The downloading of the jar files includes downloading any changes in format of the associated file or data.

Table 1 provides abbreviations for and explanations of terms used in the present specification.

TABLE 1

| Name | Symbol | Description |
|---|---|---|
| Application Developer Application | | An individual whom uses the kernel's API in order to create a specific Application. Application refers to the collection of Service Processors combined with their respective Notification Services and Application Naming Services. The collection of these Service Processors organized and maintained in the Application Register. |
| Application Finder Service | AFS | The Application Finder Service (AFS) is a remote object that may be used to find a particular application within the system. The AFS in general is used to find the Application's Naming Service to find the services available to the Application as a whole. |
| Application Manager | APPmgr | The Application Manager contains a collection of remote services for maintaining a group of applications. Its primary function is to provide services for maintaining locators, version control and a software repository for Applications. In addition, the APPmgr is responsible for maintaining Process Engines (PE's) in which applications may run their services as well as handling authentication for these Engines. |
| Application Register | | The Application Register is a data structure that maintains locations of Application specific objects that may be used by the AFS to inform interested parties about the Application. In general, the structure maintains the URL address to the Application's Software Repository as well as the remote reference to the Application's Naming Service (ANS). |
| Application Naming Service | ANS | The Applications Naming Service provides a guide to finding services within an Application. Any other Service may use this specialized Service to find and create other Services. The ANS uses the Service Register to find the remote reference to Service Process. In addition, the Service Process uses a mask within the Service Process to determine what objects a particular Service may handle or create. |
| Authentication Manager | AUTHmgr | A remote object that handles authentication for new processes attempting to gain access to Applications and their respective services. |
| Broadcaster | Bn | Refers to any remote object which Broadcast objects through a Notification Service. The n is a number used to reference the Broadcaster within the scope of flow. |
| Data Logic Object | DLO | A Data Logic Object is a subclass of Service Object that provides an interface of remote methods for fill, add, update and delete. The individual subclass of a service object provides the actual implementation of these methods. |
| Data Cell Address | DCA | The Data Cell Address provides an addressing model for data content used by Service Objects. The address provides both the classifications of the data content as well as the instance identifier that describes the object and its content. In many cases the instance identifier is a Comparison which maybe used by the Notification Service to determine who would be interested in changes to the data content of an object. |
| Comparison | | A Comparison is any object that provides an implementation of a Comparison that consists of a function called compareUsing. |

TABLE 1-continued

| Name | Symbol | Description |
|---|---|---|
| Conditional Subscription | Csn | A Conditional Subscription contains an implementation of a Comparison object and is used to provide the Notification Services with a description of a Subscriber's interest in changes to data. |
| Condition | | A Condition contains an operand, a relational operator (<, =, >,<=, =>), and implements a Comparison interface. It provides a means for comparing generic objects against constants. |
| Expression | | An Expression is used to create expression trees using 'AND' and 'OR' combined with other Comparisons. |
| Global Notification Service | GNS | A Notification Service that manages all Subscription requests for all Service Processes within an Application. The GNS handles routing to interested Service Objects using the Subscription Cache of data changes broadcast from other Service Objects. |
| Global Software Repository | GSR | The Global Software Repository is the central database for maintaining software needed by the Applications. Process Engines pull from this repository using JOD and the JODsrv in order to get up-to-date copies of the software modules. The database uses the local hierarchical file system to store the software in an organized fashion. |
| Global Subscriber Cache | GSC | The Global Subscriber Cache maintains mappings between Subscriptions and Subscriber Group. The storage is non-persistent and aids the GNS in determining which objects should be notified of objects being broadcast. |
| Java On Demand | JOD | Java On Demand refers to a thin object used to pull software modules into a Local Software Repository (LSR). JOD works in two modes 1) On-demand mode - in this mode the JOD object pulls software modules into the LSR when class modules are referenced during the actual processing of software, thus only software modules required are actually downloaded. 2) Pre-cache mode - In this mode the JOD object pulls software modules in to the LSR prior to executing any part of the software. |
| Java Virtual Machine | JVM | Refers to a software runtime interpreter created by Sun Microsystems for executing interpreted languages compiled into Java Byte Code. The Java and JPython Languages are examples. |
| Local Notification Service | LNS | A Local Notification Service is a Notification Service that resides within a Process Engine and handles notifying and pushing data to local Service Processors and Objects. The Service Process uses the Local Subscription Cache to determine which objects will be notified when another Service broadcasts data. The Local Notification Service shares its entire Subscription Cache with the Global Notification Service so that the Global Notification Service will pass changes onto the Local Notification Service and thus changes will be passed onto the Subscribers. |
| Local Software Repository | LSR | The Local Software Repository is a copy of the Global Software Repository as determined by the JOD client. |
| Local Subscriber Cache | LSC | The Local Subscriber Cache. |
| Notification Service | LNS | Since both a Global Notification Service and a Local Notification Service share many functions, the term Notification Service is a term that refers to both. |
| pQueue | | A pQueue is the base class used to describe either a pushQueue or a pullQueue. Using the definition of a pQueue the system may substitute either a pushQueue or pullQueue depending on whether or not the remote object being queued to is behind a firewall or not. |
| Process Engine | PE | A Process Engine consists of a JVM, a collection of Service Processors (pSRV), a JOD client object and a Local Notification Service (LNS). The first PE, known as PE1, will contain the ASN and its LNS will become the Global Notification Service (GNS) for the Application. PE's may run on a separate physical hardware or the same hardware or any combination thereof. Managing which physical hardware a PE runs on and what pSRV it may handle is coordinated through the Process Engine Manager |
| Process Engine Manager | Pemgr | The Process Engine Manager uses the Process Engine Register to manage (start, stop, and control function) of Process Engines for the entire environment of distributed Process Engines. |
| Process Engine Register | | The Process Engine Register is a structure maintained by the Process Engine Manager that maps Process Engines to Application/Services for the purpose of starting, stopping, and load balancing. |
| Push Queue | pushQueue | An implementation of a pQueue interface that can handle queued objects with a 'Take Thread'. The Take Thread is used to extract an object off of the Queue and evoke the objects notify handler within that thread. |
| Pull Queue | PullQueue | An implementation of a pQueue interface that can handle queued objects with a 'Wake Thread'. The Wake Thread resides on the remote PE and wakes up at timed intervals to retrieve content from a Queue on another PE. Used to work through Firewalls. |
| Repository Server/HTTPD | JODsrv | The Repository Server is an HTTP demon whose content is managed by the Global Software Repository. It allows separation of content on Application boundaries and and is generally used by a PE's JOD in order to update the Local Software Repository |
| Service Objects | | A Service Object is an object that resides within a Service Process in order to perform actions on behalf of the Service Process. Service Objects are usually associated with some form of data content with in the network. |
| Service Processors | | Service Processors are the functional producers of information within an application. A Service Processor performs functions for a given task. It may take more than one processor to create an entire Service. Service Processors may be Man-Machine Interfaces such as GUI objects that help create the illusion of Client/Server type applications. |
| Service | | A Service is a collection of Service Processors under a user-specified label. |
| Service Register | | The Service register is a data structure that maintains all Service Process registered within the Application. The data structure also maintains a functional mask that describes which class of data or functions |

TABLE 1-continued

| Name | Symbol | Description |
|---|---|---|
| | | that may be handled by a particular Service Processor. |
| Interface | | An object, which describes the method structure for other objects which behave as the implementation. An implementation of Interface must provide an implementation for every method described in the interface. An object may implement more than one interface. May also be considered a template for method in invocation. |
| Subscriber | Sn | A Subscriber is any object that can handle a notification interface. In general these objects are Service Processors or Service Objects. |
| Thread | | A lightweight process running in a parallel thread of execution. |

While the present invention has been described in connection with an exemplary embodiment, it will be understood that many modifications will be readily apparent to those skilled in the art, and this application is intended to cover any adaptations or variations thereof. For example, different labels for the various machines, objects, and nomenclature, and various hardware embodiments for the servers and machines, may be used without departing from the scope of the invention. This invention should be limited only by the claims and equivalents thereof.

What is claimed is:

1. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   wherein the plurality of content flags includes an indicator specifying whether the object contains content which has not yet been synchronized.

2. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   wherein the plurality of content flags includes an indicator specifying whether the object contains content which has been newly formed.

3. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   wherein the plurality of transmission flags includes an indicator specifying whether any changes to the content can be transmitted without transmitting the entire content.

4. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   wherein the plurality of transmission flags includes an indicator specifying whether any changes to the content should be transmitted with the content in its entirety.

5. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   wherein the plurality of transmission flags includes an indicator specifying whether one or more other objects which the data cell object references should also be transmitted when the data cell object is transmitted.

6. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   wherein the plurality of transmission flags includes an indicator specifying whether one or more other objects to which the data cell object has references should also be transmitted when the data cell object is transmitted.

7. An article of manufacture specifying a representation of an object stored in a computer-readable storage medium and capable of electronic transmission between machines in a distributed system, the article of manufacture comprising:
   a data cell object to be transmitted in a network, the data cell object including a unique code identifying the object, a plurality of content flags identifying types of content within the object, a plurality of transmission flags specifying how to broadcast the content in the network, and a plurality of error flags specifying errors in the content;
   an array containing a plurality of data elements; and
   an array of flags, each flag corresponding to a data element, wherein each flag indicates whether the corresponding data element has changed.

8. An article of manufacture specifying a representation of an object stored in a computer-readable storage medium and capable of electronic transmission between machines in a distributed system, the article of manufacture comprising:

an enumeration data cell object to be transmitted in a network, the enumeration data cell object specifying one or more unique identifiers corresponding to one or more data cell objects;

an array of identifiers identifying said one or more data cell objects; and an array of flags, each flag corresponding to a data cell object of said one or more data cell objects, wherein each flag indicates whether a content of the corresponding data cell object has been updated.

9. An article of manufacture specifying a representation of an object stored in a computer-readable storage medium and capable of electronic transmission between machines in a distributed system, the article of manufacture comprising:

an enumeration data cell object to be transmitted in a network, the enumeration data cell object specifying one or more unique identifiers corresponding to one or more data cell objects;

an array of identifiers identifying said one or more data cell objects; and an array of flags, each flag corresponding to a data cell object of said one or more data cell objects, wherein each flag indicates whether a content of the corresponding data cell object has been added.

10. An article of manufacture specifying a representation of an object stored in a computer-readable storage medium and capable of electronic transmission between machines in a distributed system, the article of manufacture comprising:

an enumeration data cell object to be transmitted in a network, the enumeration data cell object specifying one or more unique identifiers corresponding to one or more data cell objects;

an array of identifiers identifying said one or more data cell objects; and an array of flags, each flag corresponding to a data cell object of said one or more data cell objects, wherein each flag indicates whether a content of the corresponding data cell object has been deleted.

11. An article of manufacture specifying a representation of an object stored in a computer-readable storage medium and capable of electronic transmission between machines in a distributed system, the article of manufacture comprising:

an hierarchical data cell object to be transmitted in a network, the hierarchical data cell object specifying an indication of a plurality of data cell objects, the hierarchical data cell object further specifying a pointer identifying a parent data cell associated with the hierarchical data cell within a hierarchical structure of content;

wherein the plurality of data cell objects specified by the hierarchical data cell object contains data which is in a child relationship to the hierarchical data cell object.

* * * * *